(12) United States Patent
Derzhavetz et al.

(10) Patent No.: US 12,307,115 B2
(45) Date of Patent: May 20, 2025

(54) TECHNIQUES USING A VARIABLE SIZE EXTENSION AREA WITH TWO PHASE DESTAGING

(71) Applicant: Dell Products L.P., Hopkinton, MA (US)

(72) Inventors: Jenny Derzhavetz, Raanana (IL); Vladimir Shveidel, Pardes-Hana (IL); Dror Zalstein, Givatayim (IL)

(73) Assignee: Dell Products L.P., Hopkinton, MA (US)

( * ) Notice: Subject to any disclaimer, the term of this patent is extended or adjusted under 35 U.S.C. 154(b) by 51 days.

(21) Appl. No.: 18/141,722

(22) Filed: May 1, 2023

(65) Prior Publication Data

US 2024/0370193 A1    Nov. 7, 2024

(51) Int. Cl.
G06F 3/06 (2006.01)

(52) U.S. Cl.
CPC .......... *G06F 3/0644* (2013.01); *G06F 3/0619* (2013.01); *G06F 3/067* (2013.01)

(58) Field of Classification Search
CPC ....... G06F 3/0644; G06F 3/0619; G06F 3/067
See application file for complete search history.

(56) References Cited

U.S. PATENT DOCUMENTS

| | | | | |
|---|---|---|---|---|
| 9,075,733 B1* | 7/2015 | Feldman | ................. | G06F 3/064 |
| 11,042,296 B1* | 6/2021 | Shveidel | ............... | G06F 3/0659 |
| 11,093,169 B1* | 8/2021 | Shveidel | ................. | G06F 3/064 |
| 12,007,893 B1* | 6/2024 | Kim | .................... | G06F 12/0871 |
| 2017/0192892 A1* | 7/2017 | Pundir | .................. | G06F 3/0644 |
| 2017/0255709 A1* | 9/2017 | Cho | .................... | G06F 16/2255 |
| 2019/0050156 A1* | 2/2019 | Chang | ..................... | G06F 3/064 |
| 2020/0241793 A1* | 7/2020 | Shveidel | ............... | G06F 3/0604 |
| 2021/0081410 A1* | 3/2021 | Chavan | ............... | G06F 9/30047 |
| 2021/0136149 A1* | 5/2021 | Harel | .................. | H04L 67/1097 |
| 2022/0121646 A1* | 4/2022 | Harel | .................. | G06F 12/0804 |

OTHER PUBLICATIONS

U.S. Appl. No. 16/260,660, filed Jan. 29, 2019, entitled System and Method for Aggregating Metadata Changes in a Storage System, to Jenny Derzhavetz, et al.
U.S. Appl. No. 17/237,398, filed Apr. 22, 2021, entitled System and Method for Lockless Reading of Metadata Pages, to Vladimir Shveidel, et al.

\* cited by examiner

*Primary Examiner* — Nanci N Wong
(74) *Attorney, Agent, or Firm* — Muirhead and Saturnelli, LLC

(57) ABSTRACT

In at least one embodiment, processing can include: receiving metadata updates for MD pages; recording the MD updates for the MD pages in a MD log; and performing a first destaging phase that writes the MD updates from the MD log to a tablet stored on non-volatile storage. The tablet can include a bucket area and an extension area. The bucket area can include buckets each of which is a predetermined bucket size. The first destaging phase can include: writing a portion of the MD updates from the MD log to the bucket area; and writing a second portion of the MD updates from the MD log to the extension area. Each MD update of the second portion can overflow a corresponding one of the buckets which is included in the bucket area and which is associated with one of the MD pages updated by the MD update.

16 Claims, 15 Drawing Sheets

TECHNIQUES USING A VARIABLE SIZE EXTENSION AREA WITH TWO PHASE DESTAGING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a plurality of metadata (MD) updates for a plurality of MD pages; recording the plurality of MD updates for the plurality of MD pages in a MD log; and performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes: writing a first portion of the plurality of MD updates from the MD log to the first bucket area of the first tablet; and writing a second portion of the plurality of MD updates from the MD log to the first extension area of the first tablet, wherein each MD update of the second portion overflows a corresponding one of the first plurality of buckets associated with one of the plurality of MD pages updated by said each MD update.

In at least one embodiment, the first destaging phase can include: determining, for a first bucket of the first plurality of buckets of the first tablet, that the first bucket is full and includes MD updates for a corresponding first MD page of the plurality of MD pages; and responsive to determining the first bucket is full, storing one or more of the plurality of MD updates which update the corresponding first MD page in the first extension area of the first tablet. Each of the first plurality of buckets of the first tablet can include MD updates for a single corresponding one of the first plurality of MD pages.

In at least one embodiment, the first non-volatile storage can include a first plurality of tablets, wherein the first plurality of tablets can include the first tablet. Each of the first plurality of tablets can include a fixed size bucket area which has a same first size in each of the first plurality of tablets and which has a same first number of buckets in each of the first plurality of tablets. Each bucket of the same first number of buckets in each of the first plurality of tablets can be said predetermined bucket size. Each of the first plurality of tablets can include an extension area storing MD updates which overflow one or more buckets of the fixed size bucket area of said each tablet.

In at least one embodiment, the first tablet can include the first extension area occupying a first amount of storage, and wherein a second tablet of the first plurality of tablets includes a second extension area occupying a second amount of storage that is different from the first amount of storage. The second amount can be zero denoting that the second extension area occupies no storage and indicating there are no MD updates stored in the second extension area and no MD updates which overflow buckets of a second bucket area of the second tablet.

In at least one embodiment, processing can include performing a second destaging phase that destages the first plurality of tablets from the first non-volatile storage to a MD page store stored on second non-volatile storage. A first bucket of each of the first plurality of tablets can include MD updates for a first corresponding MD page. The second destaging phase can include: aggregating first MD updates for the first corresponding MD page into a first working set of MD updates for the first corresponding MD page, wherein said first working set includes MD updates for the first corresponding MD page from the first bucket of each of the first plurality of tablets, and wherein said first working set includes MD updates for the first corresponding MD page from one or more extension areas of one or more of the first plurality of tablets; reading an existing copy of the first corresponding MD page from the MD page store; generating a first updated MD page by applying the first working set of MD updates to the existing copy of the first corresponding MD page; and storing the first updated MD page in the MD page. A superblock can include tablets information describing the first plurality of tablets. The tablets information can include first information indicating, for each of the first plurality of tablets, a starting position, offset or location in the first non-volatile storage of where said each tablet is stored in the first non-volatile storage.

In at least one embodiment, the extension area of each of the first plurality of tablets can store MD updates to MD pages based on increasing order of logical indices or identifiers of corresponding MD pages. The first bucket of each of the first plurality tablets can comprise a first bucket header, and wherein the first bucket header can include an extension position identifying a starting position, offset or location of the extension area of said each tablet. The first bucket header can include an extension minimum logical index (LI) identifying the minimum LI associated with any MD update stored in the extension area of an associated tablet including the bucket header and the extension area.

In at least one embodiment, the first corresponding MD page can uniquely associated with a first LI. Processing can include: determining, in accordance with the first LI of the first corresponding MD page and in accordance with the extension minimum LI of the first bucket header of each of the first plurality of tablets, whether the extension area of said each tablet includes MD updates for the first corresponding MD page; and responsive to determining that the extension area of said each tablet includes MD updates for the first corresponding MD page, reading MD updates for the first corresponding tablet from the extension area of said each tablet and including the retrieved MD updates from the extension area in the first working set of MD updates for the first corresponding MD page. Determining, in accordance with the first LI of the first corresponding MD page and in accordance with the extension minimum LI of the first bucket header of each of the first plurality of tablets, whether the extension area of said each tablet includes MD updates for the first corresponding MD page can further include: determining whether the first LI is less than the extension minimum LI of said each tablet; and responsive to determining that first LI is less than the extension minimum LI of said each tablet, determining that the extension area of said each tablet does not include MD updates for the first corresponding MD page, and otherwise determining that the extension area of said each tablet does include MD updates for the first corresponding MD page.

In at least one embodiment, processing can include locating each tablet of the first plurality of tablets within the first non-volatile storage using, from the tablets information of the superblock, the starting position, offset or location of said each tablet identifying where said each tablet is stored in the first non-volatile storage.

In at least one embodiment, processing can include: receiving a read request to read a first MD page of the first plurality of MD pages; determining that the first MD page is not stored in a cache; and responsive to determining that the first MD page is not stored in the cache, performing read miss processing including constructing an updated version of the first MD page. Constructing an updated version of the first MD page can include: reading a stored version of the first MD page from a MD page store; and applying MD updates to the stored version of the first MD page and generating the updated version of the first MD page, wherein MD updates applied to the stored version of the first MD page include first MD updates to the first MD page and second MD updates to the first MD pages, wherein the first MD updates are included in corresponding buckets and extension areas of the first plurality of tablets, wherein the second MD updates to the first MD page are included in corresponding buckets of an active MD log stored in volatile memory and corresponding buckets of an inactive MD log stored in volatile memory. Processing can further include returning the updated version of the first MD page in response to the read request.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
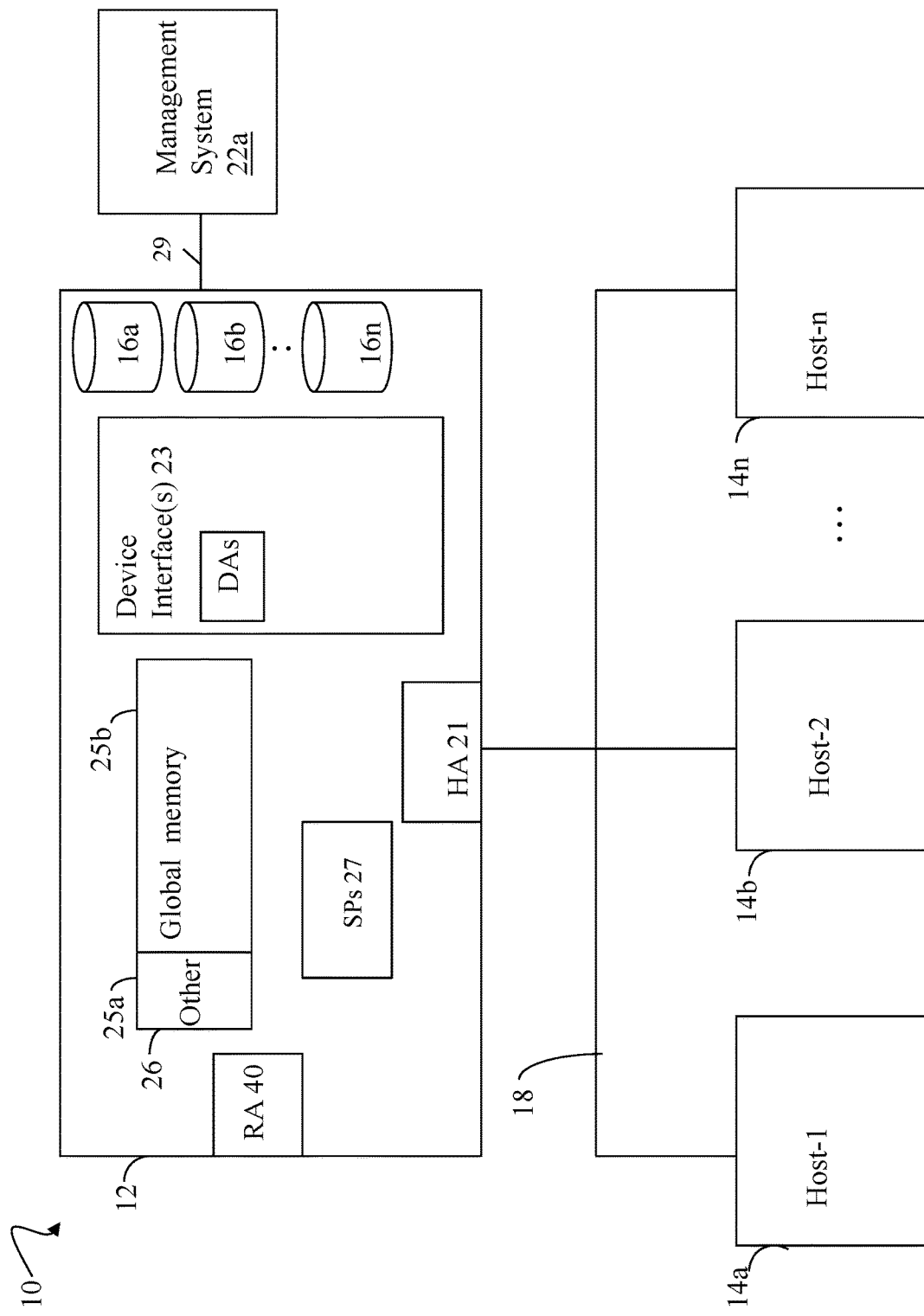
FIG. 1 is an example of components that may be included in a system in accordance with the techniques of the present disclosure.

In a data storage system, I/O operations such as read and write operations, can be received and serviced. Each I/O operation can be directed to a target logical address. For example, the I/O operations can be block-based I/O operations, where each such I/O operation is directed to a target logical address expressed as a logical device or volume in combination with an offset or logical block address (LBA). The data storage system can use mapping information to map the target logical address to a corresponding physical storage location including the content stored at the logical address. The mapping information can include a chain of metadata (MD) pages. The data storage system can be a log-based or log-structured system (LSS) which records write I/Os writing user or client content in a user data (UD) log. Recorded client writes can be subsequently flushed from the UD log and written to back-end (BE) non-volatile storage. When flushing the recorded write from the UD log, MD pages of the chain of mapping information can be allocated and/or updated as needed to map the target logical address of the recorded write to a corresponding physical storage location including content written by the recorded write.

The data storage system can also use a MD log to record updates to the MD pages. The MD page updates recorded in the MD log can include MD page updates made to MD pages of the mapping information in connection with flushing a recorded write I/O operation of the UD log. The MD log can be used in a manner similar to the UD log but with a difference that the MD log records updates to MD pages. Such MD pages can be included in the mapping information used to map logical addresses (of UD) to corresponding physical storage locations of content stored at the logical addresses. The MD log can include an in-memory or volatile MD log as well as a persistent MD log stored in non-volatile memory. The volatile or in-memory MD log can have a form and structure which facilitates efficient access, insertion, and the like. In comparison, the persistent MD log can have a different form organized in a different manner than the volatile MD log since the persistent MD log can be used primarily for recovery from an event, such as a reboot, resulting in loss of contents of the in-memory MD log. In at least one system, MD updates can be recorded in the in-memory MD log and the persistent MD log as deltas such that only the updates are recorded rather than storing, for example, complete modified or updated MD pages.

MD pages can be stored in a MD page store on BE non-volatile storage. The MD updates recorded in the in-memory MD log can be destaged to the MD page store in a two phase destage. Such destaged MD updates can be applied to an existing MD page of the MD page store to generate an updated or current MD page. In a first phase of the destage, the MD updates can be destaged to non-volatile storage and stored in a tablet. Each tablet can generally be a row structured form or presentation of the various individual MD updates from the in-memory MD log instance just destaged in the first phase. The system can have multiple tablets stored on non-volatile storage, where each of the multiple tablets corresponds to a different destaged instance of an in-memory MD log. In at least one system, the in-memory MD log can further include an active instance and an inactive instance. MD updates can be recorded in a first instance which is currently active. A second instance of the in-memory MD log can be inactive and can include MD updates being destaged in the first destage phase. Once the first active instance becomes full, a tablet switch can be performed where the first instance can transition to inactive and can be destaged to non-volatile storage and stored as a new tablet. Also in connection with the tablet switch, the second instance, previously inactive and now destaged as a table, can now transition to active while the first instance is destaging in the first phase. The foregoing role switching of active and inactive between the two in-memory MD log instances can occur in a continual manner as the currently active instance becomes full, and as the currently inactive instance is destaged as a tablet in the first phase of destaging.

When multiple tablets have been destaged by the first phase, a second phase of the destage can be performed. In the second phase of the destage, the MD updates from the multiple destaged tablets can be aggregated and applied to the existing versions of MD pages from the MD page store to generate updated MD pages. Subsequently, the updated MD pages can be persistently stored in the MD page store (thereby replacing the prior existing versions of the MD pages).

In at least one system, both the in-memory MD log instances and the tablets can include buckets of MD updates, where each bucket includes updates made to a unique corresponding MD page. Thus, the updates to a particular MD page can be stored in a corresponding bucket of the in-memory MD log and, when destaged in the first phase, also a corresponding bucket of the destaged tablet. In such a system, the size of each bucket of a destaged tablet can be a same fixed size X. Thus X can denote the maximum size or amount of storage which can be occupied by a bucket of MD page updates of a destaged table on non-volatile storage. When a bucket of the active in-memory MD log for a MD page reaches the maximum size X, the active in-memory MD log instance can transition to inactive and be destaged in the first phase. The foregoing first phase of destaging can be triggered since the bucket of the in-memory MD log has recorded a number of MD updates which, when destaged to a tablet, cannot occupy more than the maximum amount of allocated storage denoted by X. Thus when any single bucket of the active instances of in-memory MD log reaches the maximum size X, the active instance of the in-memory MD can be made inactive and then destaged as a tablet in the first phase of destaging.

Although the buckets of the in-memory MD logs can generally be balanced, there is no guarantee there will be an even distribution of MD updates across all buckets of the active instance of the in-memory MD log. In some scenarios, there can be a very uneven distribution of MD updates across the buckets. For example, a single bucket of the active instance of the in-memory MD log can reach the maximum size X much sooner than many or possibly all other buckets of the active instance. In this case, the first phase of destaging the active instance of the in-memory MD log can be triggered by the single full bucket when possibly many other buckets of the active instance are far from full (e.g., far from reaching the maximum size X). As a result of the foregoing, there can be inefficient utilization of memory in connection with the in-memory MD log instances which can result in inefficient memory usage and lead to overall performance degradation of the system. Generally, the system should be able to handle as efficiently as possible any type of imbalance or edge case scenario even those with very low probability of occurrence such as may be the case with having all received MD updates committed to only a single same bucket of the active in-memory MD log.

Some straightforward approaches to handle such edge case scenarios with the active in-memory MD log have disadvantages as discussed below.

In a first approach, each bucket can be overprovisioned to handle any possible edge case. In this manner, the fixed maximum size X of each bucket can be based on an overprovisioning amount of storage needed to support any edge case. In other words, the fixed maximum size can be determined to allow a maximum possible number of MD updates to fit into each single bucket. As a result, each of the buckets can have a very large bucket size which can result in inefficient use of a large amount of memory. Also, reading from each bucket can be inefficient for various workflows. Using other approaches besides this first approach, the fixed predefined bucket size may be smaller and selected for read efficiency to correspond to the size of a single BE read from BE non-volatile storage. However, now with the larger fixed bucket size of the first approach, such BE reads of buckets from the tablets can be less efficient.

In a second approach, processing can by-pass the second phase of destaging for MD updates of a MD page which overflow the corresponding bucket or exceed the predefined fixed bucket size of storage allocated for the bucket of a destaged tablet. With this second approach, MD updates which overflow a bucket can be applied and stored directly in the MD store without performing the second phase of destaging. However, one drawback of this second approach is that efficiency advantages of aggregating such overflowing MD updates (as performed in the second phase of destaged) are lost.

In a third approach, as discussed above, the bucket size can be smaller than, for example, the large bucket size used with the above-noted first approach. With the third approach, the smaller bucket size can be selected for optimized reads such as in connection with the MD page cache read miss workflow. However, a single full bucket can trigger the active instance of the in-memory MD log to become inactive and destaged as a tablet in the first phase of destaging. As noted above in cases where the distribution of MD updates across buckets is not even or balanced, drawbacks of this third approach can include non-optimal memory use in connection with in-memory MD log instances and decreased processing advantages in connection with MD update aggregation in the second phase of destaging. The foregoing drawbacks can adversely impact overall system performance.

Accordingly, the techniques of the present disclosure provide for efficient use of memory with instances of the in-memory MD log. The techniques of the present disclosure can efficiently handle any imbalance with respect to an uneven distribution of MD updates across buckets of the in-memory MD log. In at least one embodiment, the techniques of the present disclosure can be used to prevent early or premature destaging of an active instance of an in-memory MD log which can result from the foregoing MD update distribution imbalance such as when only a single bucket or only a few buckets have most or all of the MD updates.

In at least one embodiment, buckets of destaged tablets can have a predefined size without imposing the same size restriction on buckets of the in-memory MD log instances.

In at least one embodiment, buckets of a predefined size can be used in destaged tablets created in connection with phase one of destaging in-memory MD log instances. In such an embodiment, as may be needed, each tablet can additionally have a flexibly sized extension area stored at the end of the tablet. Thus in at least one embodiment, each tablet can be a variable size, where the tablet includes a number of buckets each a same bucket size, and where the tablet can optionally include an extension area used to store MD updates which overflow any of the fixed size buckets. The extension area can thus vary in size from 0 to whatever size is needed to accommodate the overflow of MD updates from the predefined or fixed size buckets of the tablet.

In at least one embodiment, each bucket of a destaged tablet can include a header, where the header can include information regarding any portion of the extension area used for storing the MD updates which overflow the bucket described by the header.

In at least one embodiment, the size of each bucket can be determined in any suitable manner. In at least one embodiment, the bucket size can be determined in accordance with a balanced distribution of MD updates across all buckets of the in-memory MD log. In at least one embodiment, the bucket size of each bucket can be determined in accordance with aspects of the in-memory MD log configuration, such as, for example, the amount of memory used in connection with the in-memory MD log instances, the number of buckets, and the estimated size of each MD update or delta recorded in the in-memory MD log. In at least one embodiment, overprovisioning for the predefined bucket size of destaged tablets can be determined in accordance with the needs and characteristics of the particular embodiment.

In at least one embodiment, an application can automatically control the balance between in-memory MD log memory utilization and the size of the extension areas of the tablets. Put another way, a runtime evaluation can be performed to automatically determine when to perform a tablet switch or role switch between the active and inactive in-memory MD log instances, thereby triggering the first phase destage of the active in-memory MD log instance. The runtime evaluation can be based, at least in part, on the amount of memory utilized by the active in-memory MD log instance(s) (e.g., memory utilization of the in-memory MD logs) and the amount of disk or non-volatile storage allocated in connection with tablet extension areas. For example, if the memory utilization or the amount of memory utilized by the active in-memory MD log instance is below a threshold amount across all its buckets, processing can delay tablet switching and thus delay transitioning the active in-memory MD log instance to inactive for destaging. If the amount of storage needed for an extension area for an active in-memory MD log is above a specified threshold level, processing can be performed to tablet switch and destage the active in-memory MD log instance sooner so as to reduce the size of extension area of the corresponding destaged tablets (e.g., reduce further consumption of extension area storage for destaged tablets). As may be needed, processing can be performed in at least one embodiment to control the number of tablet extensions and/or the aggregate size of the tablet extension areas in order to keep the number and/or size of the aggregated tablet extensions below specified threshold levels.

In at least one embodiment, the techniques of the present disclosure provide for the ability to parallel process buckets of MD updates in both the first and second phases of destaging.

In at least one embodiment, the techniques of the present disclosure provide for efficient read cache miss processing in connection with a read cache miss of a MD page. In such an embodiment, the predefined bucket size of destaged tablets can be selected to optimize BE reads and thus optimize reading MD updates from destaged tablets as in connection with read miss processing. In at least one embodiment using a fixed bucket size, the location of a particular bucket within a tablet can be easily determined since each bucket of each tablet is located at the same fixed offset from the starting or base location of the tablet. Further if the size of each fixed bucket of a tablet is equal to the size of a single BE read, the MD updates for a particular MD page can be obtained with a single BE read of the bucket per tablet such as in connection with read miss processing. Also, in such an embodiment, the number of tablet extensions and/or collective size of the tablet extension areas can be controlled as noted above to balance the desire for minimum extension areas (in terms of number and/or size) with the desire to efficiently use memory of the in-memory MD log instances.

In at least one embodiment, the techniques of the present disclosure can allow for selection and tuning the fixed bucket size of buckets of destaged tablets. Such selection and tuning can include selecting a size with a reasonable amount of overprovisioning in accordance with the particular embodiment.

In at least one embodiment, the techniques of the present disclosure can be used to avoid or reduce prematurely destaging an active in-memory MD log instance to a destaged tablet in the first phase of destage.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), to modify an existing replication schedule or configuration (e.g., which result in updating existing information in one or more database tables for the current replication schedule or configuration), to delete a LUN (e.g., which include deleting the LUN from a table of defined LUNs and also include modifying one or more other database tables to delete any existing snapshots of the LUN being deleted), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information. For example, management commands that read and/or modify the data storage system configuration information in the database can be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

An embodiment of a data storage system in accordance with techniques herein can perform different data processing operations or services on user data stored on the data storage system. For example, in at least one embodiment in accordance with the techniques herein, a data storage system can provide different data replication technologies, facilities or services. Such replication technologies may be characterized as local or remote. Additionally, a replication technology can provide for creating a complete, physical bit for bit copy of data (that is local and/or remote). A replication technology can provide for creating a logical or virtual point in time copy of a data source such as using a snapshot technology or facility known in the art. Such logical copies of a data source are not a complete physical copy of the data source. Rather, different techniques such as a snapshot technique can be used to create a logical or virtual copy of the data source. For example, a snapshot facility may be used in an embodiment in accordance with techniques herein to create a snapshot characterized as a logical point in time copy of data such as of a LUN or other storage object or entity. In connection with a logical device, or more generally any storage object or entity, software of a data storage system can provide one or more data replication services or facilities whereby a snapshot is one such facility that can be used to create point in time snapshot of a logical device such as a LUN for non-disruptive backup. A snapshot can appear like a normal logical device and can be used for backup, testing, and the like. In at least one embodiment, I/O operations such as read and write can be issued to a snapshot such as of a LUN. In at least one embodiment, the snapshot facility may be characterized as a local replication facility or service that takes snapshots of storage objects in a single data storage system. A local replication facility can be contrasted with a remote replication facility that provides for remote replication of storage objects from a source site or data storage system to a remote site or data storage system. Remote replication facilities provide remote copies of the storage objects for use in connection with data unavailability or disaster of the source site.

Snapshots of a source logical device or LUN can rely, for example, on copy on first write (COFW) and other techniques to track source logical device changes from the time when a snapshot was created. Any writes to the source logical device can result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device can be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device can be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

Figure 2:
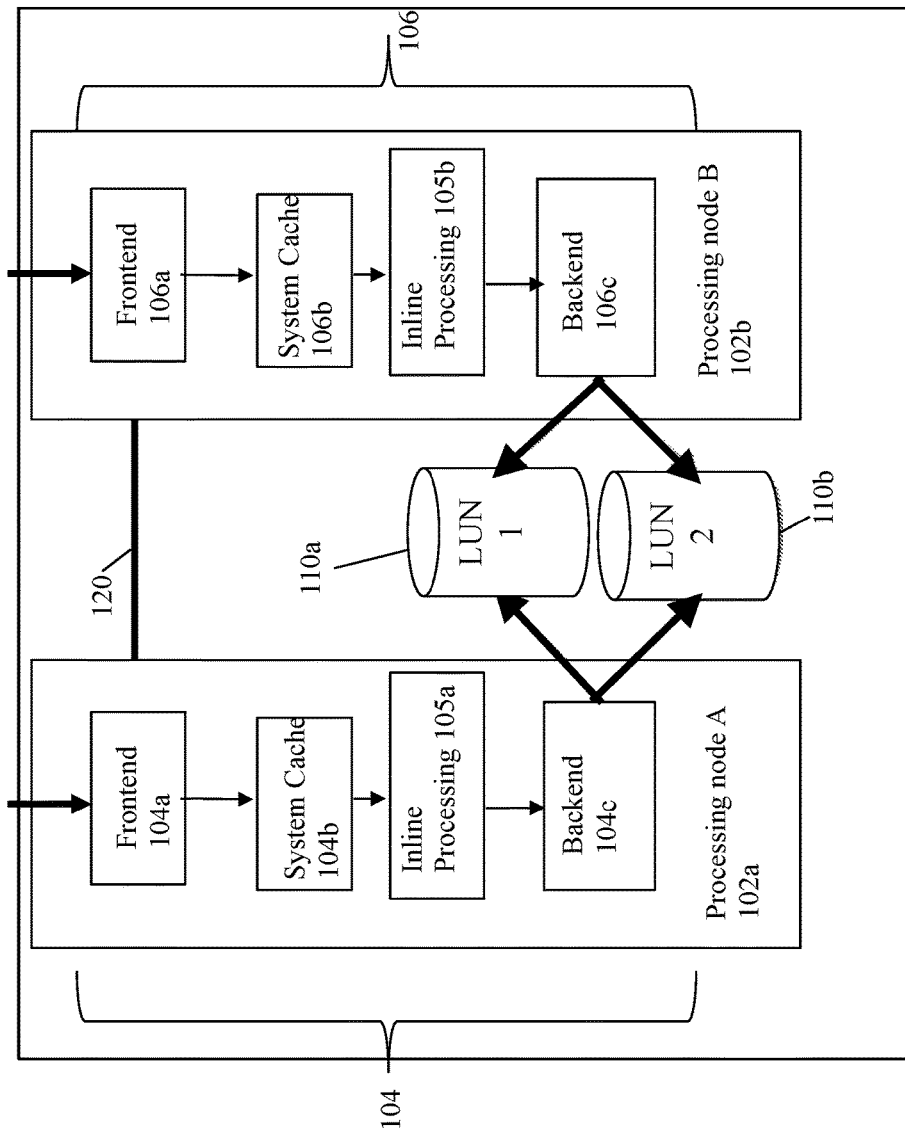
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
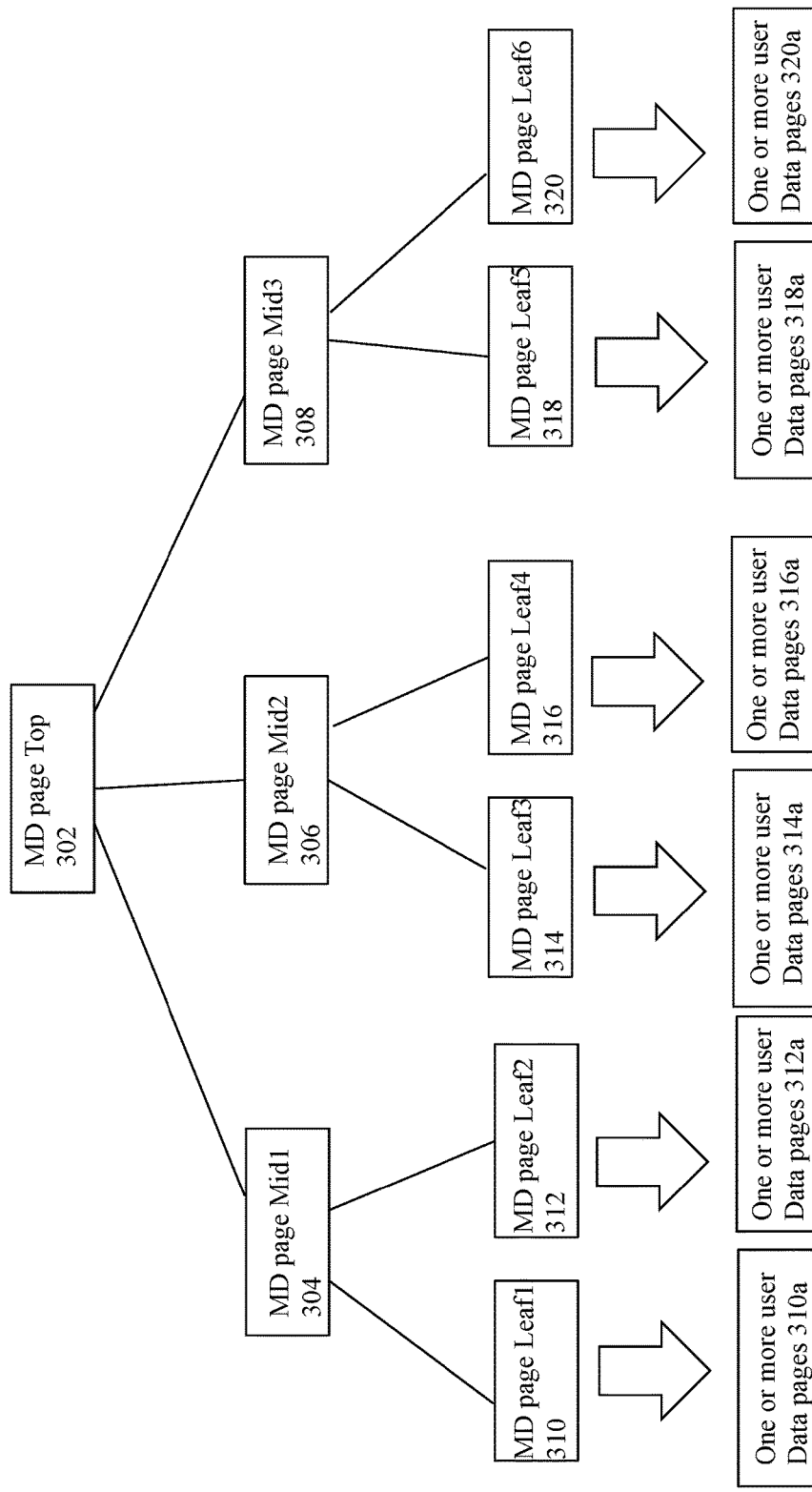
FIGS. 3, 4, 5 and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels-a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
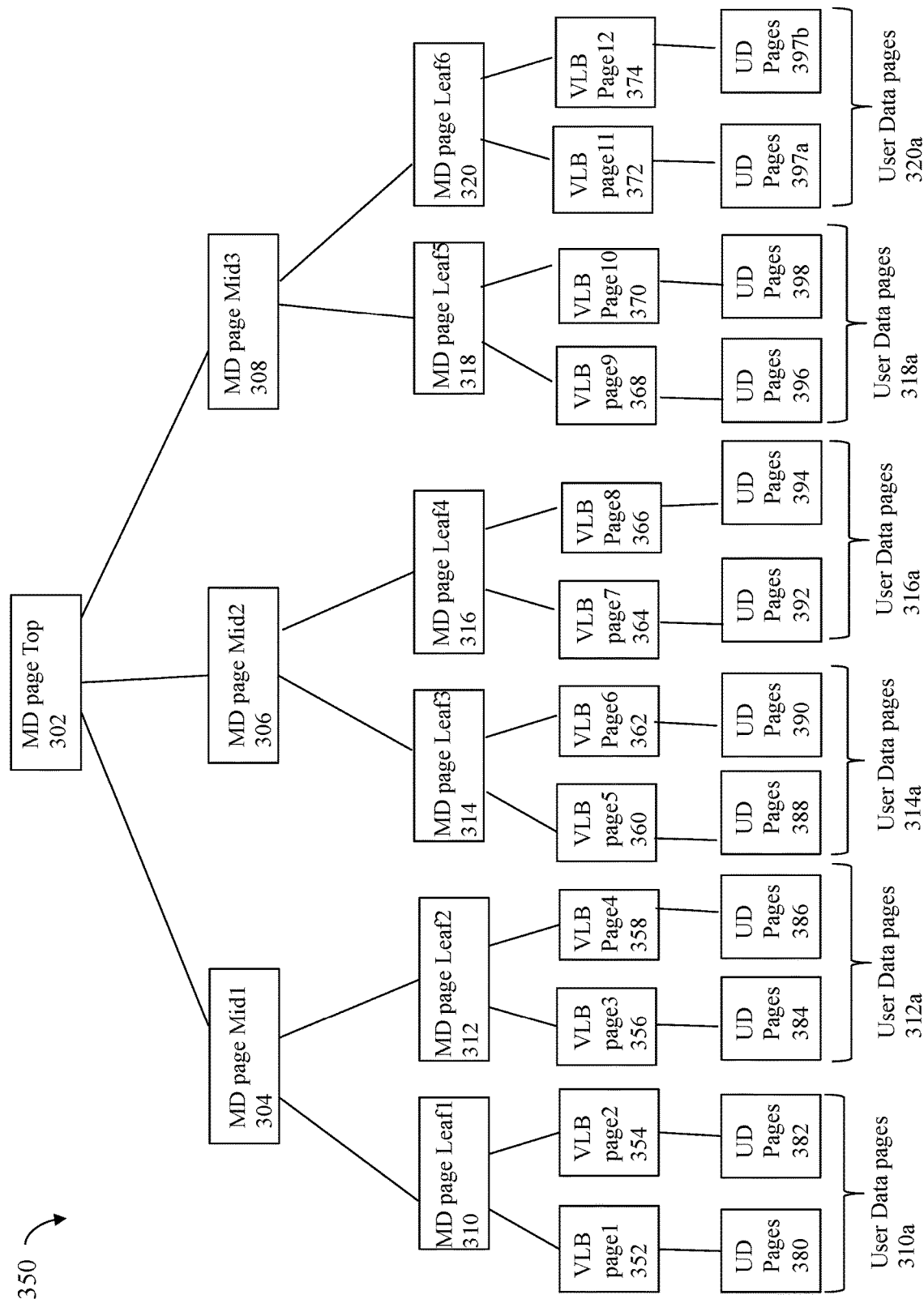

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
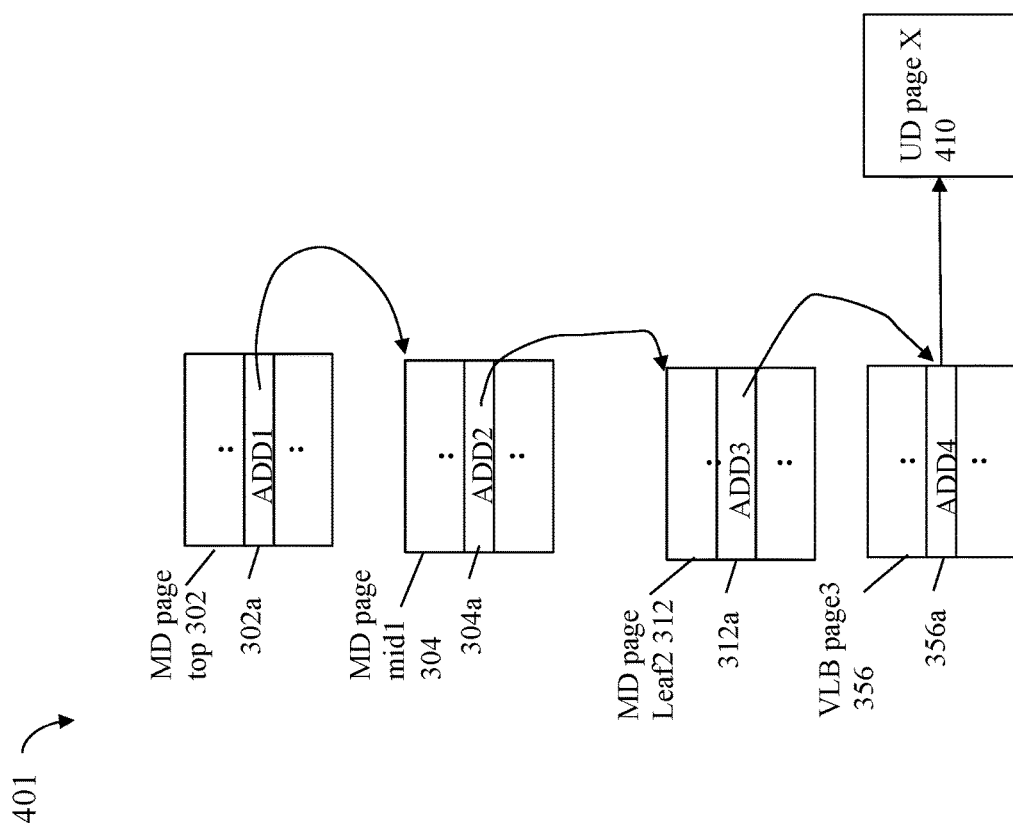

Referring to FIG. 5, shown is a more detailed representation 401 of the MD pages of the sequence traversed to access the UD page X 384 included in the set of UD pages 312a. As noted above, the MD page sequence includes MD page 302, MD page 304, MD page 312, and VLB page3 356. In the example 401, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 401, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a.

In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 401 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
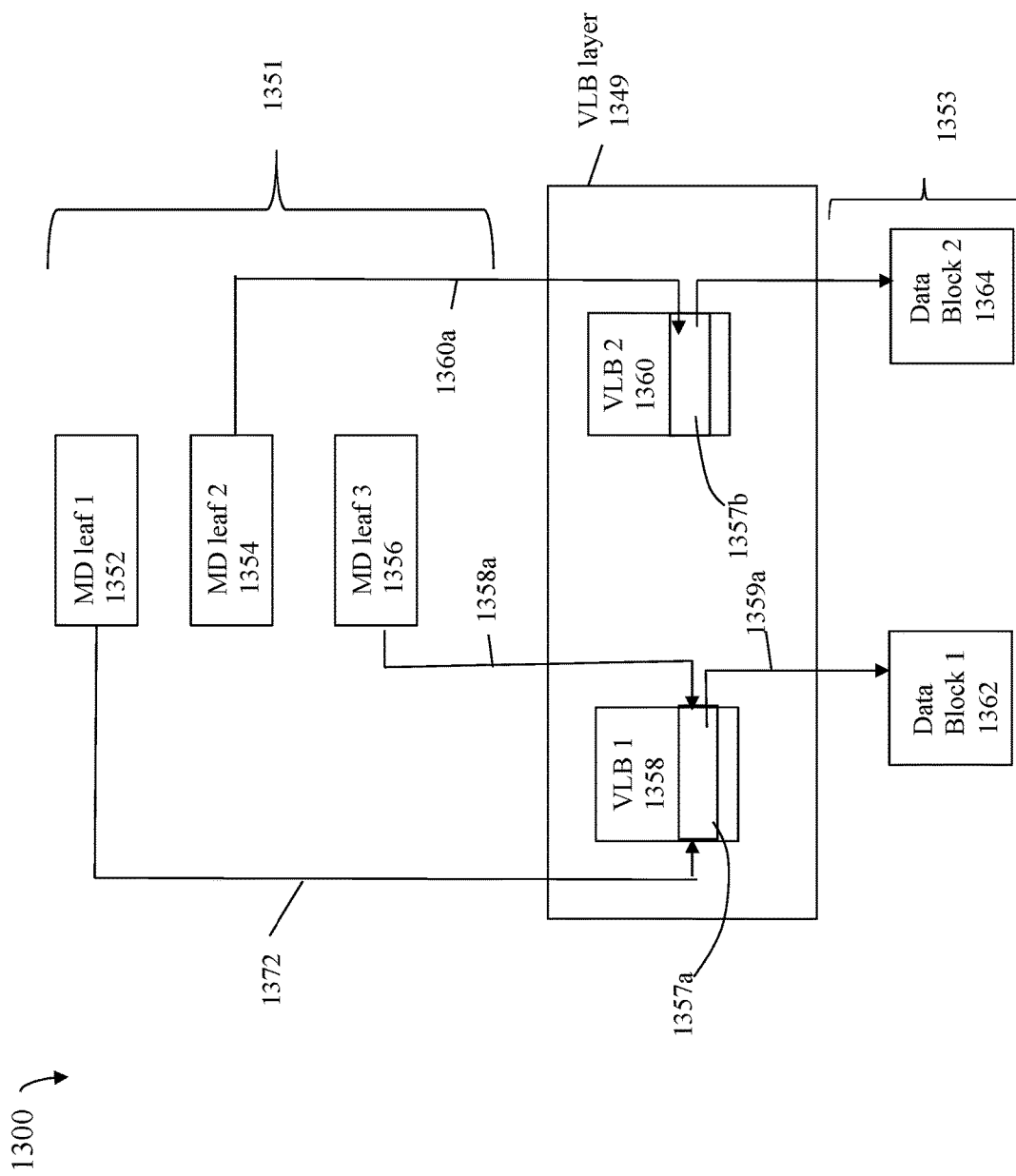

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include a pointer to, or address of, the user data block 1362.

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include a pointer to, or address of, the user data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can y be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7:
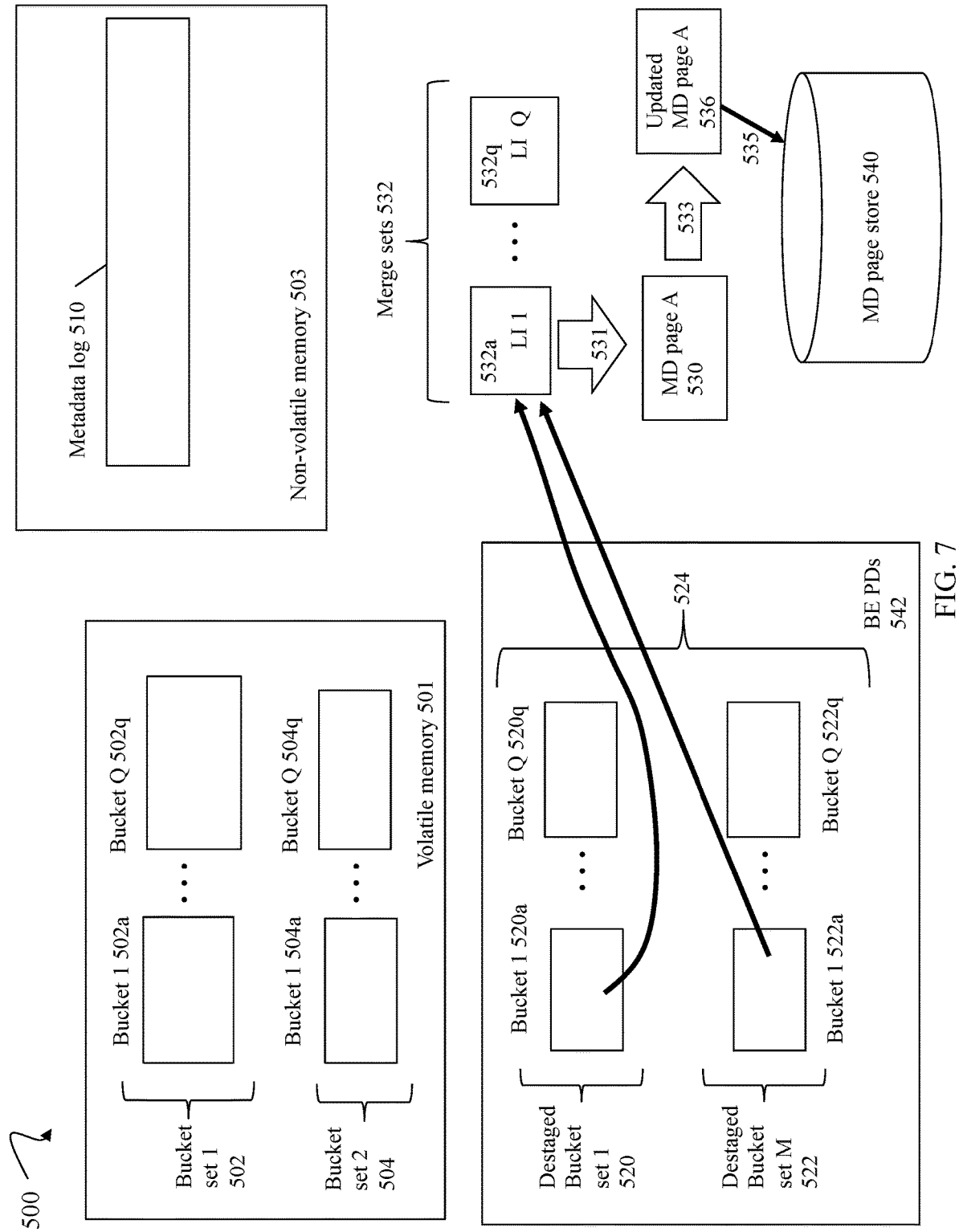
FIG. 7 is an example illustrating structures and associated data flow in at least one embodiment in accordance with the techniques of the present disclosure.

Referring to FIG. 7, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502a, of the bucket set 502. The bucket 502a can be a binary tree including metadata updates to the MD page A. The metadata update U1 can be inserted into the sorted binary tree of 502a based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in any suitable structures and organization. For example, each destaged bucket set of metadata updates for MD pages can be organized into buckets of bucket pages, where each bucket can correspond or map uniquely to a single MD page. For example, the bucket 1 520a of the destaged bucket set 1 520 can include metadata updates for the MD page A as noted above. The bucket (e.g., 520a) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520a, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520a, 522a) in each of the M destaged bucket sets of 524. The second phase of destaging can aggregate and combine the metadata updates for the MD page A 530 from the first buckets (e.g., 520a, 522a) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art and described elsewhere herein in more detail such as, for example, in connection with FIG. 8. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

Described in the following paragraphs are the techniques of the present disclosure which provide for efficient use of memory with instances of the in-memory MD log. The techniques of the present disclosure can efficiently handle any imbalance with respect to an uneven distribution of MD updates across buckets of the in-memory MD log. In at least one embodiment, the techniques of the present disclosure can be used to prevent early or premature destaging of an active instance of an in-memory MD log which can result from the foregoing MD update distribution imbalance such as when only a single bucket or only a few buckets have most or all of the MD updates.

In at least one embodiment, buckets of destaged tablets can have a predefined size without imposing the same size restriction on buckets of the in-memory MD log instances.

In at least one embodiment, buckets of a predefined size can be used in destaged tablets created in connection with phase one of destaging in-memory MD log instances. In such an embodiment, as may be needed, each tablet can additionally have a flexibly sized extension area stored at the end of the tablet. Thus in at least one embodiment, each tablet can be a variable size, where the tablet includes a number of buckets each a same bucket size, and where the tablet can optionally include an extension area used to store MD updates which overflow any of the fixed size buckets. The extension area can thus vary in size from 0 to whatever size is needed to accommodate the overflow of MD updates from the predefined or fixed size buckets of the tablet.

In at least one embodiment, each bucket of a destaged tablet can include a header, where the header can include information regarding any portion of the extension area used for storing the MD updates which overflow the bucket described by the header.

In at least one embodiment, the size of each bucket can be determined in any suitable manner. In at least one embodiment, the bucket size can be determined in accordance with a balanced distribution of MD updates across all buckets of the in-memory MD log. In at least one embodiment, the bucket size of each bucket can be determined in accordance with aspects of the in-memory MD log configuration, such as, for example, the amount of memory used in connection with the in-memory MD log instances, the number of buckets, and the estimated size of each MD update or delta recorded in the in-memory MD log. In at least one embodiment, overprovisioning for the predefined bucket size of destaged tablets can be determined in accordance with the needs and characteristics of the particular embodiment.

In at least one embodiment, an application can automatically control the balance between in-memory MD log memory utilization and the size of the extension areas of the tablets. Put another way, a runtime evaluation can be performed to automatically determine when to perform a tablet switch or role switch between the active and inactive in-memory MD log instances, thereby triggering the first phase destage of the active in-memory MD log instance. The runtime evaluation can be based, at least in part, on the amount of memory utilized by the active in-memory MD log instance(s) (e.g., memory utilization of the in-memory MD logs) and the amount of disk or non-volatile storage allocated in connection with tablet extension areas. For example, if the memory utilization or the amount of memory utilized by the active in-memory MD log instance is below a threshold amount across all its buckets, processing can delay tablet switching and thus delay transitioning the active in-memory MD log instance to inactive for destaging. If the amount of storage needed for an extension area for an active in-memory MD log is above a specified threshold level, processing can be performed to tablet switch and destage the active in-memory MD log instance sooner so as to reduce the size of extension area of the corresponding destaged tablets (e.g., reduce further consumption of extension area storage for destaged tablets). As may be needed, processing can be performed in at least one embodiment to control the number of tablet extensions and/or the aggregate size of the tablet extension areas in order to keep the number and/or size of the aggregated tablet extensions below specified threshold levels.

In at least one embodiment, the techniques of the present disclosure provide for the ability to parallel process buckets of MD updates in both the first and second phases of destaging.

In at least one embodiment, the techniques of the present disclosure provide for efficient read cache miss processing in connection with a read cache miss of a MD page. In such an embodiment, the predefined bucket size of destaged tablets can be selected to optimize BE reads and thus optimize reading MD updates from destaged tablets as in connection with read miss processing. In at least one embodiment using a fixed bucket size, the location of a particular bucket within a tablet can be easily determined since each bucket of each tablet is located at the same fixed offset from the starting or base location of the tablet. Further if the size of each fixed bucket of a tablet is equal to the size of a single BE read, the MD updates for a particular MD page can be obtained with a single BE read of the bucket per tablet such as in connection with read miss processing. Also, in such an embodiment, the number of tablet extensions and/or collective size of the tablet extension areas can be controlled as noted above to balance the desire for minimum extension areas (in terms of number and/or size) with the desire to efficiently use memory of the in-memory MD log instances.

In at least one embodiment, the techniques of the present disclosure can allow for selection and tuning the fixed bucket size of buckets of destaged tablets. Such selection and tuning can include selecting a size with a reasonable amount of overprovisioning in accordance with the particular embodiment.

In at least one embodiment, the techniques of the present disclosure can be used to avoid or reduce prematurely destaging an active in-memory MD log instance to a destaged tablet in the first phase of destage.

The foregoing and other aspects of the techniques of the present disclosure are described in more detail in the following paragraphs.

Consistent with discussion above, and with reference back to FIG. 7, in the following paragraphs the non-volatile metadata log 510 or the persisted metadata log or journal may also be referred to as an RDL or raw persisted or non-volatile MD data log; and a single bucket set, such as each of 502 and 504, of the volatile in-memory metadata log, may also be referred to an HBSB (hash-based sorted buckets). Thus, consistent with discussion above such as with reference back to FIG. 7, each node can have an active HBSB, such as bucket set 502, and an inactive or destaging HBSB, such as bucket set 504. A pair of HBSBs including an active bucket set and an inactive or destaging bucket set, may in some contexts also be referred to collectively as the in-memory or volatile memory MD logs or instances. Thus, as shown in FIG. 7, a storage node can write copies of delta updates as tuples to both the active in-memory MD log and also the RDL. The RDL can persistently store the respective tuples, deltas or MD updates in a time order sequence such as from older to newest. In contrast, MD updates, deltas or tuples stored in an in-memory MD log local to a storage node can be organized in a different manner to facilitate efficient and quick retrieval organized in hash buckets as discussed elsewhere herein. Within an HBSB, each hash bucket including MD updates for a single corresponding MD page, the MD updates, deltas or tuples can be organized in a time order sequence based on when the MD updates are received at the storage node.

Consistent with other discussion herein, the destaged bucket sets 524 can also be referred to herein as tablets. MD updates in the form of deltas or tuples can be stored in the tablets.

In at least one data storage system such as with a dual node configuration, each storage node can maintain local instances of an active in-memory MD log and an inactive in-memory MD log, and where both nodes can share a single instance of the RDL. In the event of disaster, data loss and/or data corruption, a storage node can replay the RDL to apply delta update tuples stored in the RDL to the node's local in-memory MD log to thereby restore or recover the node's in-memory MD log to a valid and consistent state.

In at least one embodiment, the techniques of the present disclosure can use the MD log infrastructure such as described in connection with FIG. 7 to record and process MD page updates. In some contexts used herein, the MD log can generally include both a persistent MD log such as the RDL 510, as well as a per node in-memory or volatile MD logs such as the HBSBs 502, 504.

Also consistent with discussion above in at least one embodiment in accordance with the techniques of the present disclosure, MD updates or deltas can be recorded in the active HBSB. When the active HBSB is full or responsive to the existence of another specified trigger condition, a tablet switch or role switch can be performed resulting in the active HBSB being destaged in a first phase also sometimes referred to as "destage1". In particular, the active HBSB can be destaged in destage1 and stored on non-volatile storage, such as an SSD tier, in the tablet. In some instances, the non-volatile storage used for storing destaged tablets can be referred to as an MDL tablets tier. In at least one embodiment, the tablet can generally be a structure which includes rows of information. Thus the recorded MD updates of the active HBSB can be stored in a different structure and presentation on disk as a tablet in the MD tablets tier. Consistent with discussion above, destaging can also include a second phase sometimes referred to as "destage2". Destage2 can include aggregating MD updates across multiple tablets of the MDL tablets tier and then applying the aggregated MD updates to corresponding MD pages of the MD page store. Thus with reference to FIG. 7, an active HBSB (active bucket set) can transition to become the inactive HBSB (inactive bucket set) which is then destaged as denoted by the destaged bucket sets or tablets 524.

In at least one embodiment, an HBSB bucket corresponding to MD updates for a particular MD page can be destaged to a corresponding bucket of a tablet. In at least one embodiment, within each bucket of the HBSB, the bucket corresponding to a particular MD page can store MD updates in time order such as based on when the MD updates are inserted into the bucket and thus when received by the infrastructure. In at least one embodiment, within each bucket of a tablet, the bucket corresponding to a particular MD page can store MD updates for the MD page in increasing time order as in the HBSB.

In at least one embodiment, buckets stored within each single destaged tablet can be accessed and organized based, at least in part, using the unique logical indices or LIs of MD pages corresponding to the buckets. In at least one embodiment, the buckets of each single destaged tablet can be stored based on increasing logical indices or LIs of MD pages corresponding to the buckets of the destaged tablet.

In at least one embodiment, each bucket of each tablet can be a same size such as, for example, 4K bytes, 8K bytes, 16K bytes, or some other suitable size. The bucket size can be predefined and fixed. In at least one embodiment, the bucket size can be selected with a goal of optimizing efficiency of BE reads such as reading a bucket from the MDL tablets tier in connection with destaging, read miss processing, and other processing described herein. In at least one embodiment, the bucket size can also be selected to account for any needed overprovisioning which can vary with embodiment.

Figure 8:
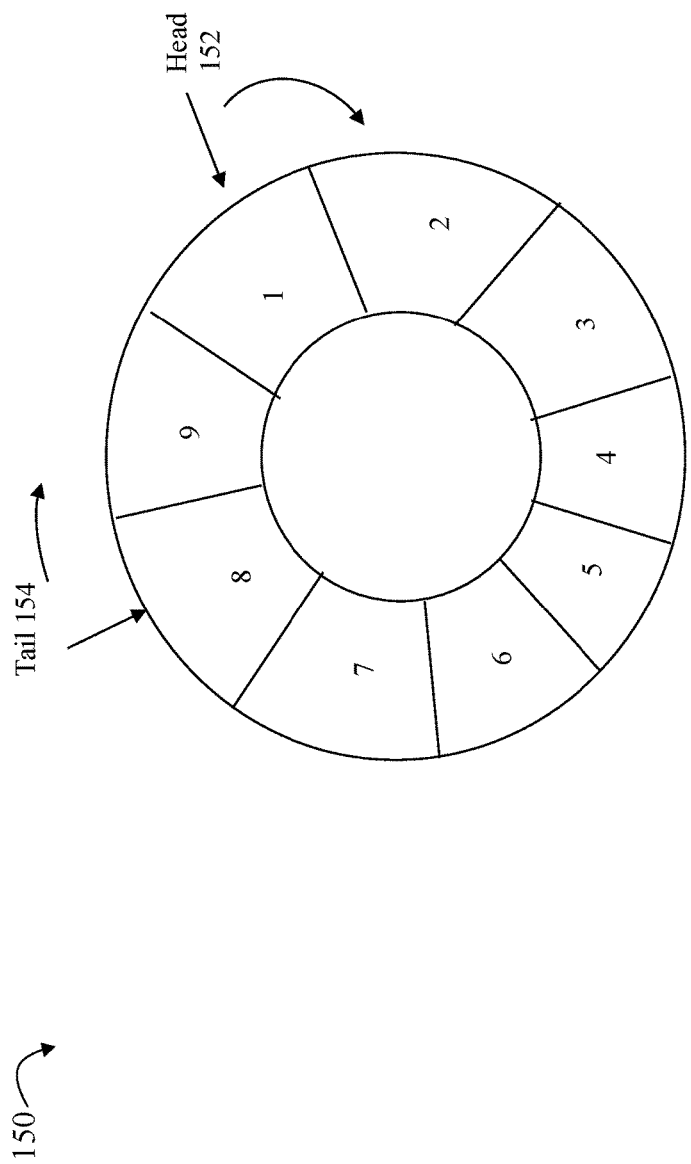
FIG. 8 is an example of a ring buffer in at least one embodiment in accordance with the techniques of the present disclosure.

Referring to FIG. 8, shown is an example 150 illustrating a ring buffer which can be used in at least one embodiment in accordance with the techniques of the present disclosure.

In at least one embodiment in accordance with the techniques of the present disclosure, the entries of the RDL can be organized as a ring buffer such as described in connection with FIG. 7. Additionally, in such an embodiment, the destaged bucket sets or tablets 524 can also be organized as a ring buffer (sometimes simply referred to as a ring).

The ring buffer 150 can be managed using the head pointer 152 and the tail pointer 154. Both pointers are advanced in the clockwise flow in this example. Entries are allocated from the head of the list as denoted by the head pointer 152. For example, the entry 1 can be allocated by the head pointer 152. Subsequently, the head pointer 152 is advanced to the entry 2 since entry 2 is the next entry to be allocated when needed. To further illustrate such as with respect to a ring buffer of tablets 524, the tail pointer 154 can denote the entry in the ring buffer that is to be destaged next or is currently being destaged. For example, the tail pointer 154 is currently pointing to entry 8. Once entry 8 is destaged, the tail pointer 154 is advanced to entry 9. The ring buffer allocates new entries in a FIFO (first in first out) manner from the head pointer based on the sequential positioning in the buffer as denoted by the entry numbers 1 through 9. In at least one embodiment for ring buffer management, both the "full" and "empty" cases of the ring buffer can look the same where the head pointer 152 and the tail pointer are equal or point to the same entry in the ring buffer. In the full case, all entries in the ring buffer are allocated and in the empty case, all entries in the ring buffer are free or available for use. Any suitable technique can be used to distinguish between the full and empty ring buffer cases when the head pointer and the tail pointer point to the same entry. For example, a count can be maintained for the ring buffer denoting the number of allocated entries. The count can be initialized to 0, incremented each time an entry is allocated by the head pointer advancing, and decremented each time an entry is flushed and reclaimed by advancing the tail pointer.

In at least one embodiment, the ring buffer can be implemented using an array or other suitable structure where, for example, the entries 1 through 9 as in FIG. 8 correspond to array indices. The circular nature of the ring buffer can be implemented using the linear array by considering the sequential array indices as if connected end to end or as a contiguous sequential array of elements. Once the head or tail pointer reaches entry 9, the head or tail pointer continues with the next entry in the sequence which is entry 1. In this manner the entries or indices of the linear array form a logical loop or ring as illustrated in the FIG. 8.

Thus in connection with destaged tablets 524 of FIG. 7 which are organized and maintained as a ring buffer such as described in connection with FIG. 8, an inactive HBSB can be destaged as a tablet at the head of the ring buffer, and tablets can be released or deleted from the tail of the ring buffer.

What will now be described are further details regarding use of buckets and associated extension areas of each destaged tablet.

In at least one embodiment, buckets of the MDL tablets tier can each be a fixed predetermined size without imposing the same size boundary restriction on buckets of the in-memory HBSBs. During destage1 of an inactive HBSB, MD updates of a bucket overflowing the predefined bucket size can be stored at the end of the tablet in a tablet extension area or extension. Each destaged tablet of the MDL tablets tier can be a variable size object generally including two parts: a bucket area of regular buckets forming a fixed size portion, and a tablet extension area forming a variable size portion. In at least one embodiment, the regular buckets of each tablet can be the same fixed size. The tablet extension area can be completely omitted with a size of zero for a tablet if there is no overflow of MD updates of the buckets of the tablet.

In at least one embodiment, MD updates can be written to the extension area in chunks each having an associated size in accordance with a specified write granularity such as 2 MB. In such an embodiment, MD updates which overflow buckets of a tablet can be collected and persisted temporarily in the RDL until the 2 MB write granularity is reached. Subsequently, the 2 MBs of collected MD updates which overflow the buckets can be written from the RDL to the tablet extension area as a single 2 MB chunk in accordance with the write granularity in at least one embodiment. Generally, any suitable write size granularity can be used. Also more generally, the overflow MD updates which are eventually written to the tablet extension area can be temporarily persisted in the RDL or other persistent storage.

In at least one embodiment, each bucket of a destaged tablet can include a header with information describing the extension, if any, associated with the destaged tablet.

In at least one embodiment, the bucket size of each bucket of destaged tablets can be determined in accordance with a balanced distribution of MD updates across all buckets. Generally, the bucket size can be determined in any suitable manner. For example, in at least one embodiment, the bucket size can be determined in accordance with aspects of the HBSB or in-memory MD log configuration including the size or amount of memory used for each HBSB such as when there is a balanced distribution of MD updates, the number of HBSB buckets, and the estimated size of each recorded delta denoting a MD update. Overprovisioning for the predefined bucket size of tablets can be determined according to system needs which can vary with embodiment.

In at least one embodiment, an application can control the balance between HBSB memory utilization since the buckets of the HBSBs are not bounded by the predefined fixed size of buckets of destaged tablets. In at least one embodiment, an application can automatically evaluate and monitor the current state including the amount of memory utilized by the active HBSB, the size of the buckets of the active HBSB, and the amount of storage needed currently for the tablet extension of the active HBSB to decide when the perform a tablet switch or role switch triggering destaging of the currently active HBSB. For example in at least one embodiment, a tablet switch or role switch triggering destaging of the currently active HBSB can be performed in response to an occurrence any one or more of the following trigger conditions: a specified number of HBSB buckets exceeding the predefined size of a destaged tablet bucket; the total amount of storage needed for the tablet extension area when the active HBSB is destaged exceeding a specified threshold; and/or the total amount of memory utilized by the active HBSB exceeding a specified threshold. It should be noted that the total amount of storage needed for the tablet extension area for the active HBSB can also be expressed as the total aggregated size of all MD updates which will overflow the fixed size buckets of a tablet when the active HBSB is destaged in destage1.

Figure 9:
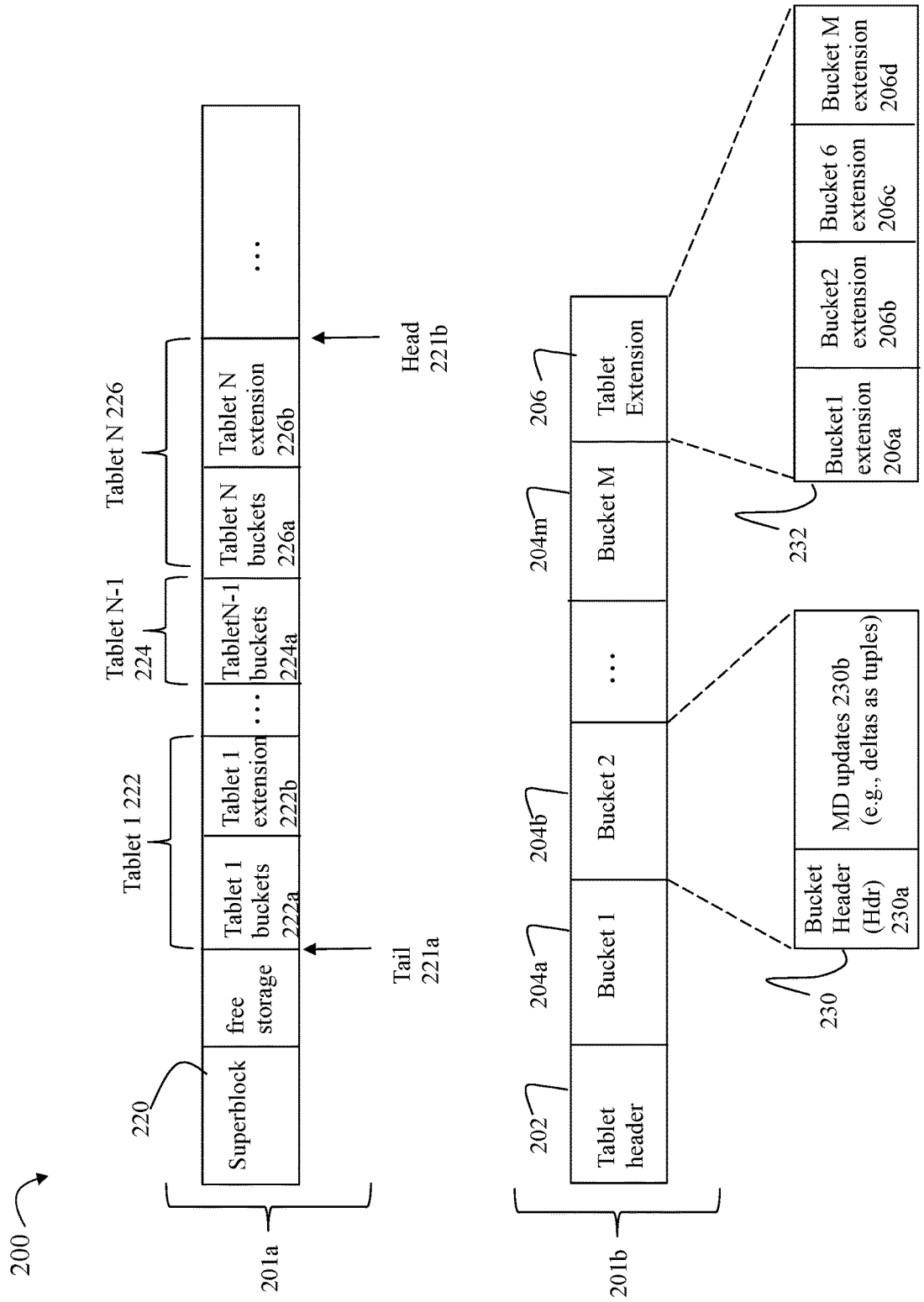
FIGS. 9, 10 and 11 illustrate various structures of information that can be used in at least one embodiment in accordance with the techniques of the present disclosure.

Referring to FIG. 9, shown is an example 200 illustrating a data layout of the MDL tablets tier and the per tablet layout in at least one embodiment in accordance with the techniques of the present disclosure.

The example 200 includes 201a illustrating the data layout of the MDL tablets tier and 201b illustrating the per tablet data layout in at least one embodiment in accordance with the techniques of the present disclosure.

The MD tablets tier layout 201a illustrates the structure or content of the MDL tablets tier storing multiple destaged tablets 1 through N. In particular, the element 201a includes a superblock 220 followed generally by N tablets where each of the N tablets includes the same sized set of fixed buckets and an optional tablet extension area storing any needed MD updates which overflow the set of fixed buckets of the tablet. The tablet 1 222 includes buckets 222a and a corresponding tablet 1 extension area 222b. Tablet N−1 224 includes buckets 224a with no tablet extension area. Tablet N 226 includes buckets 226a with a corresponding tablet N extension area 226b. Generally, each of the tablet bucket areas such as 222a, 224a and 226a can be the same size since each tablet bucket area includes the same number of buckets and where each such bucket is the same predetermined size. Any tablet having MD updates which overflow its associated bucket area can be stored at the end of the tablet in the tablet's corresponding tablet extension. Since the sizes of the tablet extensions can vary, the initial or starting offset of each tablet within the MDL tablets tier 201a can also vary.

The element 221a can denote the position of the tail pointer of the ring buffer of destaged tablets and the element 221b can denote the position of the head pointer of the ring buffer of destaged tablets. Generally, the position of 221a and 221b denote a current state of such pointers at a particular point in processing.

The superblock 220 can generally be characterized as a map of the MDL tablets tier layout described, for example, the starting or initial location or position of each tablet within the MDL tablets tier. Information which can be stored in the superblock 220 in at least one embodiment in accordance with the techniques of the present disclosure is described elsewhere herein such as in connection with FIG. 10.

In at least one embodiment, the superblock 220 can be stored both on disk (e.g., non-volatile storage) and in memory (e.g., volatile storage).

The element 201b provides further detail regarding the layout or structure of each tablet within the MDL tablets tier. For example, the element 201b provides further details regarding the general layout of each tablet 222, 224 and 226. In at least one embodiment, buckets stored within a single tablet can be organized based on increasing logical indices or LIs of MD pages corresponding to the buckets. In at least one embodiment, bucket extensions stored within the single tablet's extension 206 can be organized and sorted based on increasing logical indices or LIs of MD pages corresponding to the bucket extension.

Each tablet 201b can include a tablet header 202, M buckets 204a-m and an optional tablet extension area 206.

The element 230 provides further detail regarding the layout of each bucket, such as bucket 2 204b in at least one embodiment in accordance with the techniques of the present disclosure. Although the element 230 is illustrated as providing further information of bucket 204b, generally each of the buckets 204a-m can have the same layout as denoted by 230.

The bucket layout 230 can include a bucket header (hdr) 230a and MD updates 230b of the corresponding bucket 204b. Both 230a and 230b, and thus the size of each bucket, can be a fixed same size. In at least one embodiment, the MD updates 230b of each bucket can be stored as deltas or tuples described in more detail elsewhere herein. In at least one embodiment, buckets 204a-m can be stored in order of increasing LI of the corresponding MD pages associated with the buckets 204a-m. Within each bucket 230, the MD updates 230b can be stored in increasing time order based on time of insertion. The bucket header 230a can generally be characterized as a map of the per bucket layout and is described in more detail elsewhere herein such as, for example, in connection with FIG. 11. For example, the bucket header 230a can include complete information about a corresponding tablet extension area 206, if any.

The element 232 provides further detail regarding the tablet extension 206. The tablet extension 206, 232 can generally include one or more bucket extensions depending on how many, if any, buckets 204a-m are overflowed with MD updates. Thus the tablet extension 206 can generally be characterized as a MD update overflow area including MD updates of buckets 204a-m which overflow or exceed the defined fixed bucket size. In particular, the tablet extension 232 can include one or more bucket extensions each including MD updates for a particular one of the buckets 204a-m. In this example, there are M buckets 204a-m. However, only buckets 1, 2, 6 and M include corresponding bucket extension areas 206a-d in the tablet extension area 206, 232. In at least one embodiment, buckets within each tablet can be stored in order of increasing associated MD page LI. Each bucket B is uniquely associated with a MD page K having a corresponding LI uniquely identifying the MD page K. Thus a bucket B and its bucket extension E1 included in the tablet extension area 232 are both associated with the LI of the MD page K corresponding to the bucket B. In at least one embodiment, bucket extensions (MD updates thereof) of the tablet extension 232 can be sorted in increasing order of the MD page LIs associated with the bucket extensions stored in the tablet extension 232.

In at least one embodiment, each of the buckets 204a-m can generally include one or more pages or storage portions.

Figure 10:
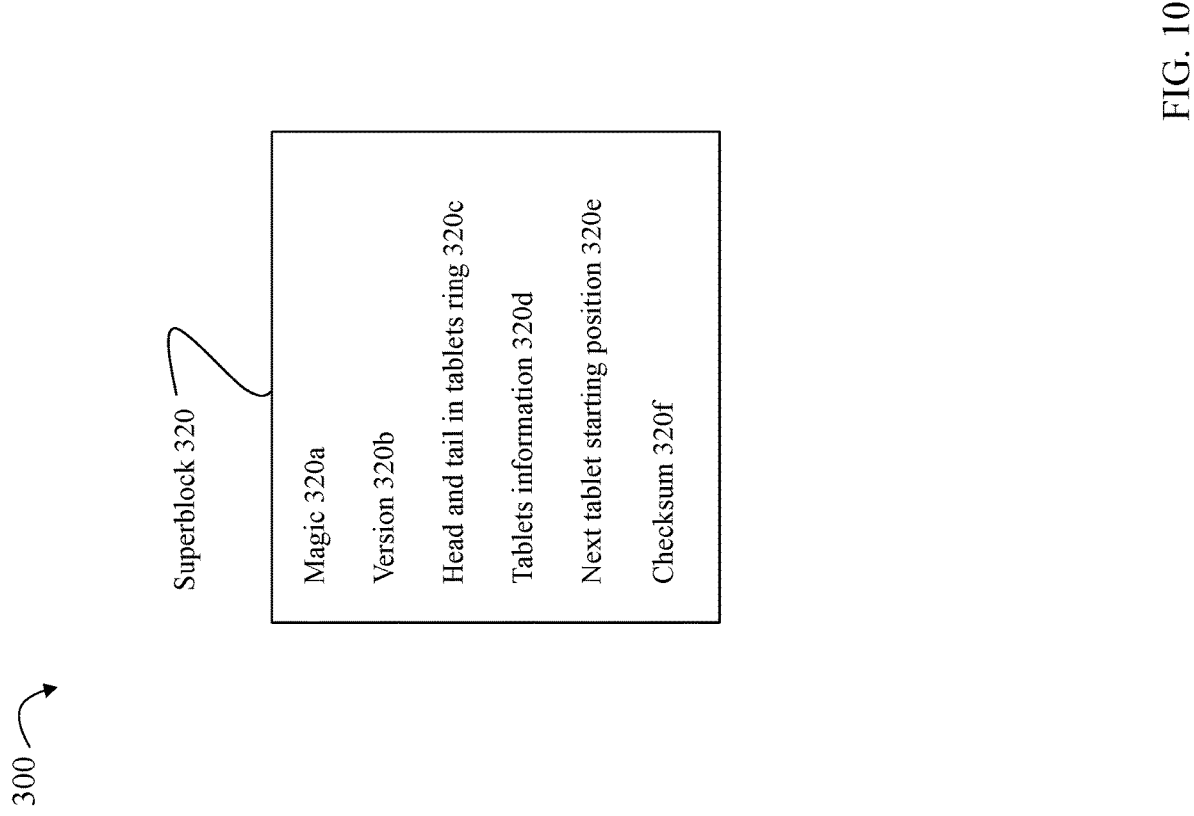

Referring to FIG. 10, shown is an example 300 providing additional detail regarding a super block of the MDL tablets tier in at least one embodiment in accordance with the techniques of the present disclosure. The superblock 320 can include the following fields of information: magic 320a, version 320b, head and tail in tablets ring 320c, tablets information 320d, next tablet starting position 320e, and checksum 320f.

The magic 320a can be a number or identifier (ID) which varies with page type or structure. Generally, the magic 320a can be used as an additional piece of information in connection with validating and verifying the superblock. For example, the magic 320a of the superblock can be expected to be a first predetermined value or ID denoting that the magic 320a is included in the superblock. It can be used, for example, in detecting a possible superblock corruption if the content of the magic field 320a is not equal to the first predetermined value or ID.

The version 320b can identify the particular version of the data layout being used for the MDL tablets tier. At various times, the layout of the tablets within the MD tablets tier can change or be updated and therefore assigned a new version number. Thus, the version 320b can affect the particular data layout used to interpret the content and various structures of the MDL tablets tier.

The head and tail in tablets ring 320c can denote, respectively, the positions of the head and tail pointers within the tablets ring buffer. Consistent with other discussion herein in at least one embodiment, storage for the next tablet of the MDL tablets tier used to store the next destaged HBSB can be allocated from the position denoted by the head pointer; and storage of destaged tablets of the MDL tablets tier can be reclaimed from the position denoted by the tail pointer.

The tablets information 320d can store information of the various multiple destaged tablets of the MDL tablets tier. Generally, the tablets information 320d can store information about the tablets currently stored in the MDL tablets tier. In at least one embodiment, for each tablet stored in the ring buffer of the MDL tablets tier, the following information can be stored in the field 320d: Tablet ID (e.g., unique ID of the tablet instance); status (e.g., status of the tablet); and disk position or location of the tablet in MDL tablets tier (e.g., identifies the starting point, location or position of the tablet within the MDL tablets tier).

In at least one embodiment, each HBSB can be assigned a unique ID when the HBSB is active. When the HBSB is destaged and stored as a tablet, this ID can then become the tablet's tablet ID as stored in the tablets information field 320d. In at least one embodiment, the HBSB IDs and thus tablet IDs can monotonically increase with time such that increasing order of tablet IDs can denote increasing time order of MD updates of such tablets. Thus tablet N can be destaged prior to tablet N+1, where N and N+1 are IDs of corresponding HBSBs destaged as the corresponding tablets.

The next tablet starting position 320e can identify the location, offset or disk location in the MDL tablets tier of where to store the next destaged HBSB in destage1 as a next tablet.

The checksum 320f can be used for data verification, such as to detect data corruption, regarding the content of the superblock. Checksums are generally known in the art and can be determined based on the current value or content of the superblock.

Figure 11:
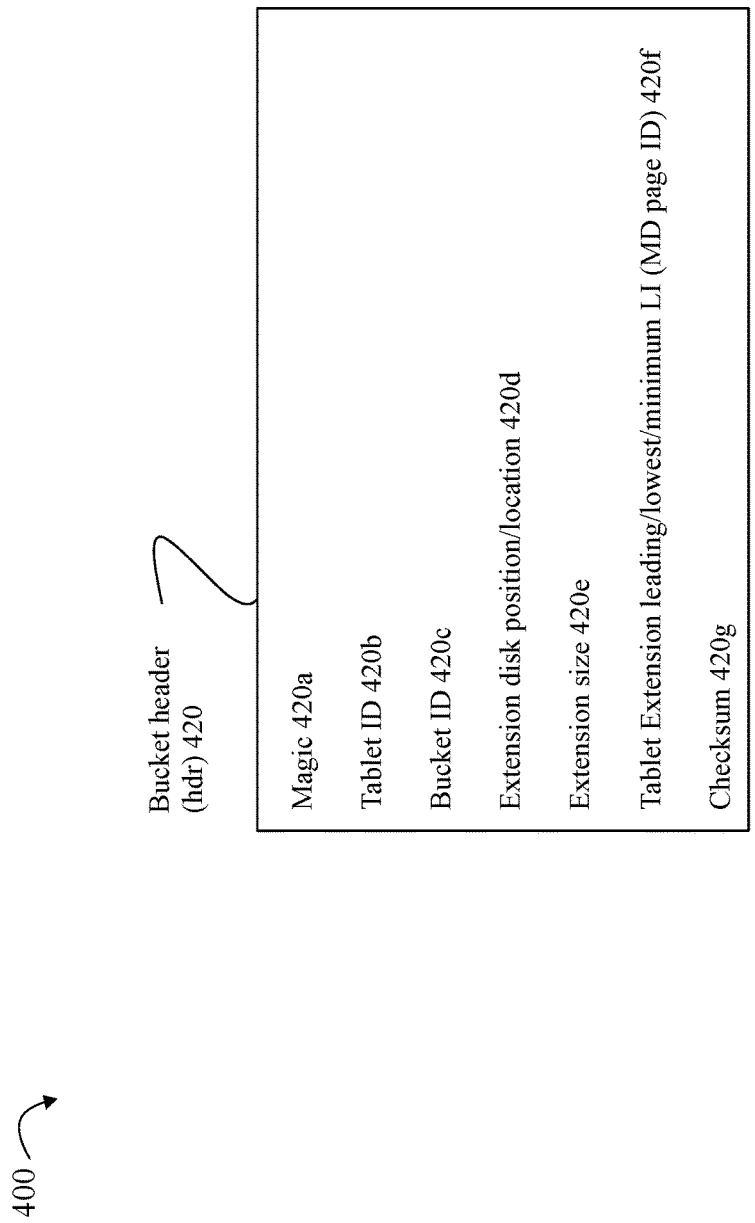

Referring to FIG. 11, shown is an example 400 providing additional detail regarding a bucket header for a bucket of MD updates stored in a tablet of the MDL tablets tier in at least one embodiment in accordance with the techniques of the present disclosure. The bucket header (hdr) 420 can include the following fields of information: magic 420a, tablet ID 420b, bucket ID 420c, extension disk position/location 420d, extension size 420e, tablet Extension leading/minimum LI (MD page ID) 420f, and checksum 420g.

The magic 420a can be a number or identifier (ID) which varies with page type or structure. Generally, the magic 420a can be used as an additional piece of information in connection with validating and verifying the bucket and/or bucket header. For example, the magic 420a of each bucket header can be expected to be a particular predetermined value or ID denoting that the magic 420a is included in a bucket header. It can be used, for example, in detecting a possible data corruption if the content of the magic field 420a of a presumed bucket header is not equal to the particular expected predetermined value or ID.

The tablet ID 420b can be a unique tablet ID used to uniquely identify the particular tablet which includes this particular bucket header 420. The tablet ID is discussed elsewhere herein and can be included in general tablets information 320d of FIG. 10.

The bucket ID 420c can be an ID uniquely identifying the bucket header and its corresponding bucket of a particular tablet. In at least one embodiment, the bucket ID corresponding to a particular MD page (where the bucket having the bucket ID includes MD updates for the particular MD page) can be determined, at least in part, based on the unique logical index or LI of the particular MD page. In at least one embodiment, buckets can be stored within a tablet based on increasing bucket IDs where bucket IDs of the tablet can be sequential consecutive integers where the initial or first bucket of the tablet has an associated first bucket ID such as zero or 1. In at least one embodiment, each bucket with an associated bucket ID can include MD updates for a corresponding MD page having an associated LI. Generally, the MD page LI can be mapped to a corresponding bucket ID, and a bucket ID can be mapped to a corresponding MD page LI. Thus, the bucket ID can be based, at least in part, on the LI of the corresponding MD page having MD updates stored in the bucket with the bucket ID.

The extension disk position/location 420d can denote the starting position or location of the tablet extension area for the particular tablet including the bucket described by the bucket header 420. Generally, 420d can denote the starting position or location of the tablet extension area of the tablet identified by tablet ID 420b. For example with reference back to FIG. 9, bucket 2 204b has an associated bucket 2 extension 206b within the tablet extension area 206,232. The field 420d can identify the location or position of tablet extension area 232, 206 within the MDL tablets tier.

The extension size 420e can denote the size of the tablets extension area for the particular tablet having the tablet ID 420b. If there is no tablet extension area, then 420e can be zero.

The tablet extension leading/minimum LI (MD page ID) 420f can denote the logical index or LI (e.g., MD page ID) of the leading, first or minimum LI of all MD pages having associated MD updates stored in the tablet extension area. In at least one embodiment, within each tablet, buckets can be sorted based on increasing values of corresponding LIs of MD pages. In at least one embodiment, each tablet extension area can include bucket extensions of MD updates for corresponding overflowed buckets. The tablet extension area can order the bucket extensions, and thus stored MD updates, based on increasing order of corresponding MD page LIs of the bucket extensions, and thus stored MD updates. Thus, the field 420f can include the first or leading, and thus the minimum or lowest LI associated with a bucket extension having MD updates stored in a tablet extension area.

Consistent with other discussion herein, the tablet extension leading LI 420f can be used in connection with determining, for a particular bucket B, whether there are MD updates stored in a corresponding bucket extension of the tablet extension area. For example, there can be 10 buckets, identified by associated LIs or MD page IDs 1 through 10, in a tablet. For simplicity of illustration, assume that the bucket ID is also the LI or MD page ID of the corresponding MD page for the bucket. Assume that only buckets with associated LIs 5 and 6 have MD update overflows and thus only buckets 5 and 6 have MD updates stored in corresponding bucket extensions of the tablet extension area. In this case, the value of 420*f* can be 5 (denoting the MD page with the MD page ID or LI=5). When performing read miss processing discussed elsewhere herein or with other workflows which read all MD updates of a particular MD page and thus a particular bucket and its bucket extension (if any), the processing can compare the MD page ID or LI of the particular bucket to the value of 420*f* to determine whether to retrieve MD updates from the tablet extension area. With reference to the example above where the value of 420*f* is 5, assume that processing is performed for bucket 3 having an associated LI=3. Processing can compare the bucket 3's LI of 3 to the value of 320*f* where, if the bucket LI is less than the value of 420*f*, it can be determined that the particular bucket with the bucket LI does not have any MD updates stored in the tablet extension area (e.g., there is no bucket extension for the particular bucket with the bucket LI). Otherwise, processing can determine that the particular bucket with the bucket LI does have MD updates stored in the tablet extension area. Continuing with the above particular example, the bucket 3 with the LI of 3 can be compared to 5, the value of 420*f*, where processing determines that the bucket with the LI=3 is less than 5, and determines that bucket with the LI=3 does not have any MD updates stored in the tablet extension. As denoted by 420*f*, the tablet extension includes overflow MD updates for MD pages where the lowest or minimum LI of such MD pages is 5.

The checksum 420*g* can be used for data verification, such as to detect data corruption, regarding the content of the bucket header. Checksums are generally known in the art and can be determined based on the current value or content of the bucket header.

As noted above, the size of each tablet can vary and is flexible due to the varying size of any corresponding tablet extension. Thus, when performing destage1 for a current HBSB stored as a current tablet in the MDL tablets tier, the initial position or location of the next tablet within the MDL tablets tier cannot be determined or known until destage1 for the current tablet has been completed or at until the size of the current tablet's tablet extension area is known. Storage for the current tablet's tablet extension area can be pre-allocated or allocated at the start of destage1 of the current tablet. Pre-allocating all required space for the current tablet's tablet extension at the start of destage1 requires traversing over all buckets of the current HBSB, which can introduce a significant delay. In at least one embodiment, destage1 can be performed for only a single tablet at a time thereby eliminating the need to pre-allocate all the required current tablet disk space in advance. In such an embodiment, a single storage allocator can be used per data storage system to allocate storage of the MDL tablets tier. In at least one embodiment, since extension storage allocation can be performed at most once per bucket and a very low rate of bucket allocation requests can be expected, minimal contention in connection with such storage allocation can be expected when processing buckets of a tablet in parallel.

In at least one embodiment, multiple MD updates to one or more MD pages can be included in a single transaction where the multiple updates can be committed as a transaction to the active HBSB. In such an embodiment, related commit processing can include inserting the multiple MD updates into the active HBSB. Additionally in at least one embodiment, once the multiple MD updates have been inserted into the active HBSB, processing can also include: tracking and updating the expected size or total amount of storage which will be needed to store the active HBSB as a destaged tablet of the MDL tablets tier; and determining how many buckets (if any) exceed the predefined tablet bucket size. An embodiment can define one or more rules, conditions or criteria which denote when to trigger a tablet switch or role switch of the active and inactive HBSB and thus trigger destaging of the active HBSB. The one or more rules, conditions or criteria can specify when to trigger the tablet or role switch of the HBSBs in accordance with: the size or total amount of storage needed to store the active HBSB as a destaged tablet of the MDL tablets tier; and the number of buckets exceeding the predefined tablet bucket size. For example, a first rule or condition can specify to perform the tablet or role switch of the HBSBs if the size or total amount of storage needed to store the active HBSB as a destaged tablet of the MDL tablets tier exceeds a first threshold. A second rule or condition can specify to perform the tablet or role switch of the HBSBs if the number of buckets exceeding the predefined tablet bucket size is more than a threshold number of buckets. A third rule or condition can specify to perform the tablet or role switch if both of the following are true: the size or total amount of storage needed to store the active HBSB as a destaged tablet of the MDL tablets tier exceeds a threshold; and the number of buckets exceeding the predefined tablet bucket size is more than a threshold number of buckets.

What will now be described are flowcharts of processing steps that can be performed in at least one embodiment in accordance with the techniques of the present disclosure.

Figure 12:
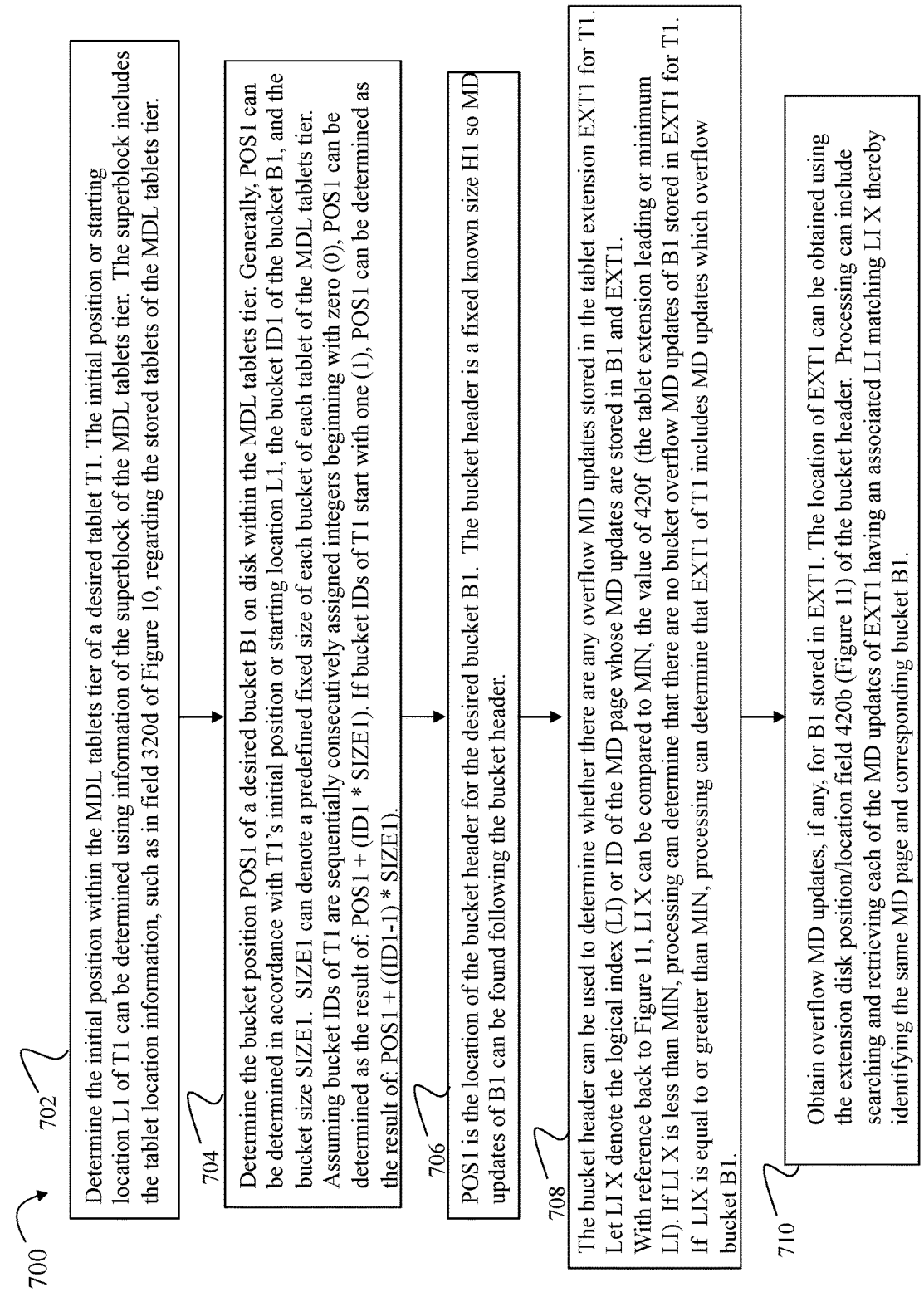
FIGS. 12, 13, 14 and 15 are flowcharts of processing steps which can be performed in at least one embodiment in accordance with the techniques of the present disclosure.

Referring to FIG. 12, shown is a flowchart 700 of processing steps that can be performed to locate a particular bucket and any associated bucket overflow MD updates stored in the extension in a particular tablet in at least one embodiment in accordance with the techniques of the present disclosure. The flowchart 700 also includes processing to retrieve the MD updates such as for a particular MD page from the particular bucket of the tablet as well as from the tablet's extension area. Thus, the flowchart 700 processing can be performed, for example, in connection with other flowcharts and workflows described herein.

At the step 702, processing can be performed to determine the initial position within the MDL tablets tier of a desired tablet T1. The initial position or starting location L1 of T1 can be determined using information of the superblock of the MDL tablets tier. The superblock includes the tablet location information, such as in field 320*d* of FIG. 10, regarding the stored tablets of the MDL tablets tier. From the step 702, control proceeds to the step 704.

At the step 704, processing can be performed to determine the bucket position POS1 of a desired bucket B1 on disk within the MDL tablets tier. Generally, POS1 can be determined in accordance with T1's initial position or starting location L1, the bucket ID1 of the bucket B1, and the bucket size SIZE1. SIZE1 can denote a predefined fixed size of each bucket of each tablet of the MDL tablets tier. Assuming bucket IDs of T1 are sequentially consecutively assigned integers beginning with zero (0), POS1 can be determined as the result of: POS1+(ID1*SIZE1). If bucket IDs of T1 start with one (1), POS1 can be determined as the result of: POS1+ ((ID1−1)*SIZE1). From the step 704, control proceeds to the step 706.

At the step 706, POS1 is the location of the bucket header for the desired bucket B1. The bucket header is a fixed known size H1 so MD updates of B1 can be found in the step 706 following the bucket header. From the step 706, control proceeds to the step 708.

At the step 708, the bucket header can be used to determine whether there are any overflow MD updates stored in the tablet extension EXT1 for T1. Let LI X denote the logical index (LI) or ID of the MD page whose MD updates are stored in B1 and EXT1. With reference back to FIG. 11, LI X can be compared to MIN, the value of 420*f* (the tablet extension leading or minimum LI). If LI X is less than MIN, processing can determine that there are no bucket overflow MD updates of B1 stored in EXT1 for T1. If LIX is equal to or greater than MIN, processing can determine that EXT1 of T1 includes MD updates which overflow bucket B1. From the step 708, control proceeds to the step 710, At the step 710, processing can be performed to obtain overflow MD updates, if any, for B1 stored in EXT1. The location of EXT1 can be obtained using the extension disk position/location field 420*b* (FIG. 11) of the bucket header. Processing can include searching and retrieving each of the MD updates of EXT1 having an associated LI matching LI X thereby identifying the same MD page and corresponding bucket B1.

Figure 13:
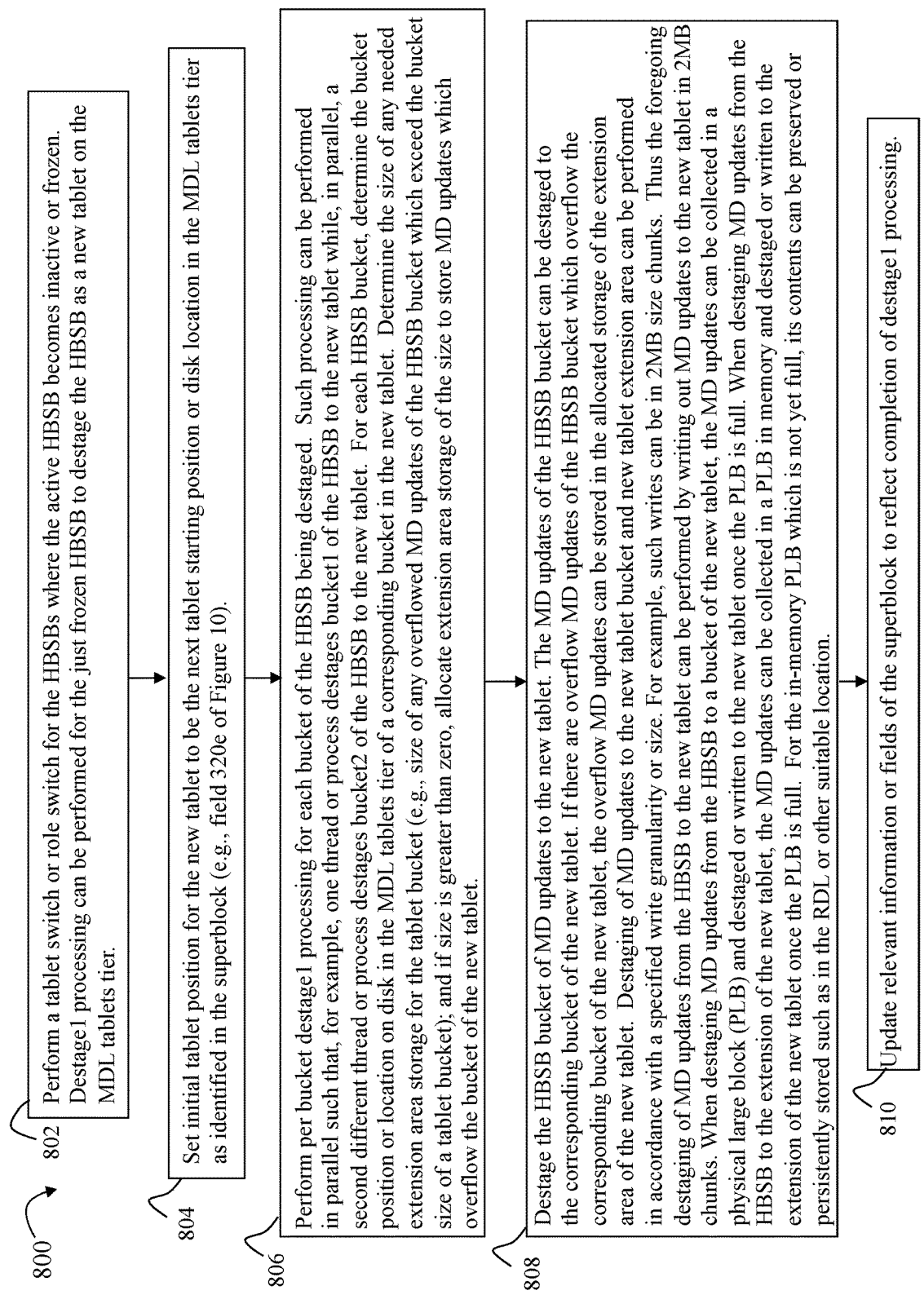

Referring to FIG. 13, shown is a flowchart 800 of processing steps that can be performed in connection with destage1 of an HBSB in at least one embodiment in accordance with the techniques of the present disclosure. Destage1 processing is generally described elsewhere herein such as in connection with FIG. 7 processing. Additionally, FIG. 13 processing using the techniques of the present disclosure further provides for locating applying MD updates from the tablet extensions.

At the step 802, a tablet switch or role switch for the HBSBs can be performed, where the active HBSB becomes inactive or frozen. Destage1 processing as described herein and in subsequent steps of the flowchart 800 can be performed for the just frozen HBSB to destage the HBSB as a new tablet on the MDL tablets tier. From the step 802, control proceeds to the step 804.

At the step 804, processing can set initial tablet position for the new tablet to be the next tablet starting position or disk location in the MDL tablets tier as identified in the superblock (e.g., field 320*e* of FIG. 10). From the step 804, control proceeds to the step 806.

At the step 806, per bucket destage1 processing can be performed for each bucket of the HBSB being destaged. Such processing can be performed in parallel such that, for example, one thread or process destages bucket1 of the HBSB to the new tablet while, in parallel, a second different thread or process destages bucket2 of the HBSB to the new tablet. For each HBSB bucket, processing can include determining the bucket position or location on disk in the MDL tablets tier of a corresponding bucket in the new tablet. Processing can include determining the size of any needed extension area storage for the tablet bucket (e.g., size of any overflowed MD updates of the HBSB bucket which exceed the bucket size of a tablet bucket); and if the size is greater than zero, allocating extension area storage of the size to store MD updates which overflow the bucket of the new tablet. From the step 806, control proceeds to the step 808.

At the step 808, processing can destage the HBSB bucket of MD updates to the new tablet. The MD updates of the HBSB bucket can be destaged or written to the corresponding bucket of the new tablet. If there are overflow MD updates of the HBSB bucket which overflow the corresponding bucket of the new tablet, the overflow MD updates can be stored in the allocated storage of the extension area of the new tablet. Destaging of MD updates to the new tablet bucket and new tablet extension area can be performed in accordance with a specified write granularity or size. For example, such writes can be in 2 MB size chunks. Thus the foregoing destaging of MD updates from the HBSB to the new tablet can be performed by writing out MD updates to the new tablet in 2 MB chunks. When destaging MD updates from the HBSB to a bucket of the new tablet, the MD updates can be collected in a physical large block (PLB) and destaged or written to the new tablet once the PLB is full. When destaging MD updates from the HBSB to the extension of the new tablet, the MD updates can be collected in a PLB in memory and destaged or written to the extension of the new tablet once the PLB is full. For the in-memory PLB which is not yet full, its contents can be preserved or persistently stored such as in the RDL or other suitable location. From the step 808, control proceeds to the step 810.

At the step 810, processing can update relevant information or fields of the superblock to reflect completion of destage1 processing. For example with reference back to FIG. 10, the step 810 can include updating the head pointer of 320*c*, updating tablets information 320*d* to include information describing the new tablet just populated, updating the next tablet starting position 320*e*; and updating the checksum 320*f*.

Figure 14:
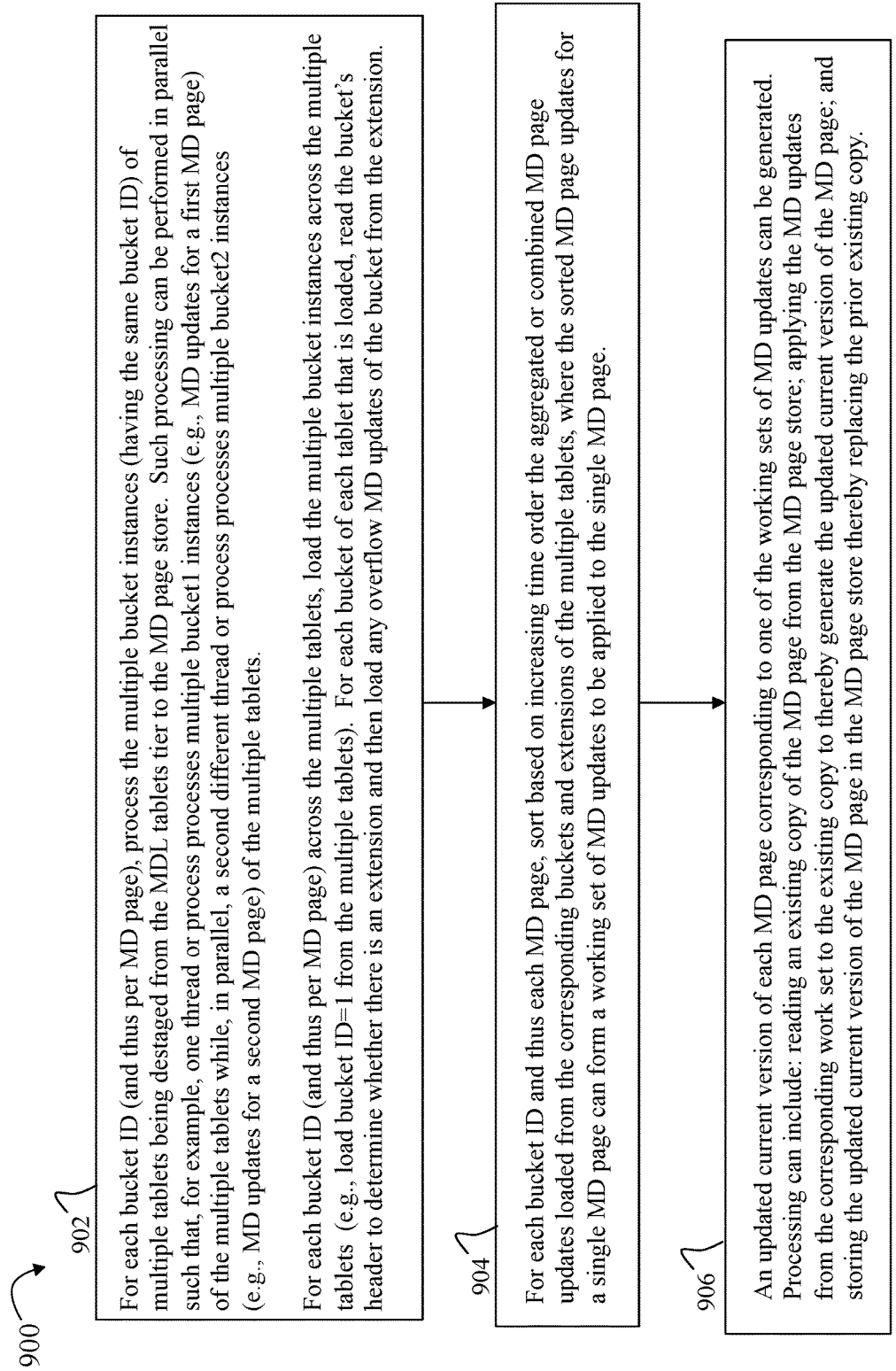

Referring to FIG. 14, shown is a flowchart 900 of processing steps that can be performed in connection with destage2 in at least one embodiment in accordance with the techniques of the present disclosure. Destage2 processing is generally described elsewhere herein such as in connection with FIG. 7 processing. Additionally, FIG. 14 processing using the techniques of the present disclosure further provides for locating, aggregating and applying MD updates from the tablet extensions.

At the step 902, for each bucket ID (and thus per MD page), process the multiple bucket instances (having the same bucket ID) of multiple tablets being destaged from the MDL tablets tier to the MD page store. Such processing can be performed in parallel such that, for example, one thread or process processes multiple bucket1 instances (e.g., MD updates for a first MD page) of the multiple tablets while, in parallel, a second different thread or process processes multiple bucket2 instances (e.g., MD updates for a second MD page) of the multiple tablets.

For each bucket ID (and thus per MD page) across the multiple tablets, load the multiple bucket instances across the multiple tablets (e.g., load the buckets with bucket ID=1 from the multiple tablets). For each bucket of each tablet that is loaded, read the bucket's header to determine whether there is an extension and then load any overflow MD updates of the bucket from the extension. From the step 902, control proceeds to the step 904.

At the step 904, for each bucket ID and thus each MD page, sort based on increasing time order the aggregated or combined MD page updates loaded (in step 902) from the corresponding buckets and extensions of the multiple tablets. The sorted MD page updates for a single MD page can form a working set of MD updates to be applied to the single MD page. From the step 904, control proceeds to the step 906.

At the step 906, an updated current version of each MD page corresponding to one of the working sets of MD updates can be generated. Processing can include: reading an existing copy of the MD page from the MD page store; applying the MD updates from the corresponding work set to the existing copy to thereby generate the updated current version of the MD page; and storing the updated current version of the MD page in the MD page store thereby replacing the prior existing copy.

Consistent with other discussion herein, one or more MD pages, or portions thereof, can be read in connection with various workflows. For example, a node can receive an I/O operation, such as a read I/O operation, that reads user data from a target logical address, such as from a LUN and an LBA or offset on the LUN. In connection with processing or servicing the read I/O operation, the node can read metadata from one or more MD pages to obtain the requested read data. The one or more MD pages can be used, for example, to map the target logical address to the corresponding physical storage location of the requested read data. The node can receive an I/O operation, such as a write I/O operation, that writes user data to the target logical address. In connection with processing or servicing the write I/O operation, the node may also need to read metadata from one or more MD pages. In at least one embodiment, each request to read a MD page can result in a cache miss or a cache hit. What will now be described in connection with FIG. 15 below is processing that can be performed in connection with servicing a read request for a MD page in at least one embodiment in accordance with the techniques of the present disclosure.

Figure 15:
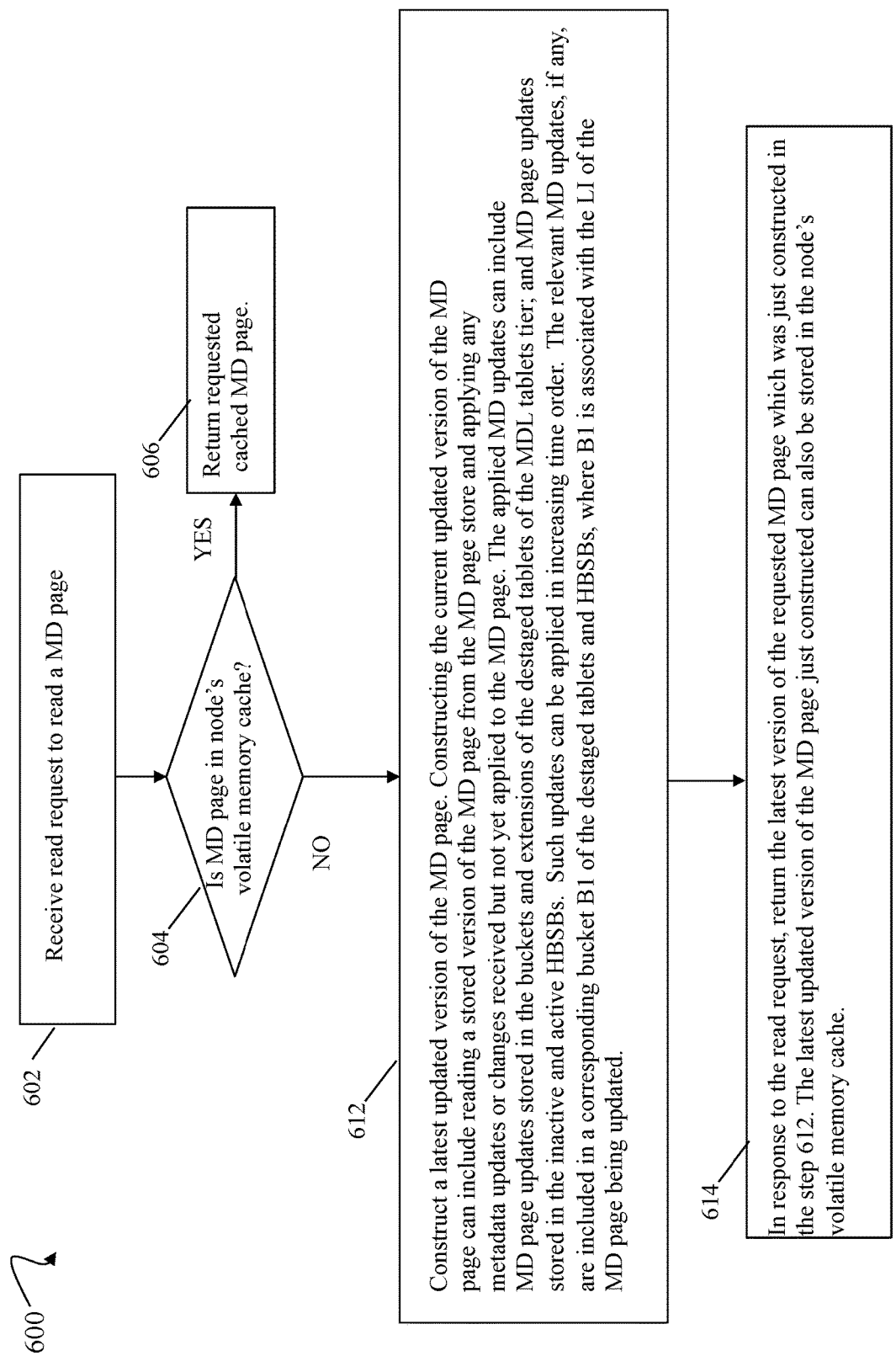

Referring to FIG. 15, shown is a flowchart 600 of processing steps that can be used in connection with servicing a read request to read metadata from a MD page.

At the step, 602 a node may receive a read request for a MD page. From the step 602, control proceeds to the step 604.

At the step 604, a determination is made as to whether the MD page is currently stored in the node's volatile memory cache. If the step 604 evaluates to yes, a read cache hit is determined with respect to the requested MD page. If the step 604 evaluates to no, a read cache miss is determined with respect to the MD page and read cache miss processing can be performed. If the step 604 evaluates to yes, control proceeds to the step 606.

At the step 606, processing is performed to return a response to the read request received in the step 602. Processing of the step 606 can include retrieving the requested MD page from the node's local volatile memory cache, and returning the requested MD page in response to the read request.

If the step 604 evaluates to no, control proceeds to the step 612. At the step 612, processing can be performed to construct the latest version of the requested MD page. Constructing the current version of the requested MD page C1, where C1 can denote the LI of the current MD page, can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the HBSBs or bucket sets 502 and 504 (e.g., the node's in-memory metadata logs), and also from the destaged tablets or bucket sets 524. The metadata updates for the particular MD page can be retrieved based on the LI uniquely associated with the MD page, where the LI is mapped uniquely to a particular bucket in each of the HBSBs or bucket sets 502, 504, and each of the destaged tablets of 524. The applied MD updates can include MD page updates stored in the buckets and extensions of the destaged tablets 524 of the MDL tablets tier; and MD page updates stored in the inactive and active HBSBs 502, 504. Consistent with other discussion herein, the metadata updates for the MD page can be aggregated and merged. A stored version of the MD page can be retrieved from the MD page store 540, and the merged metadata updates for the MD page can then be applied to the stored version of the MD page to thereby obtain the latest version of the MD page. The metadata updates for the particular MD page C1 can be retrieved based on the LI=C1 uniquely associated with the MD page C1, where the LI is mapped uniquely to a particular bucket in each of the HBSBs or bucket sets 502, 504, and each of the tablets of 524. Consistent with other discussion herein, the metadata updates for the MD page C1 can be aggregated and merged. A stored version of the MD page C1 can be retrieved from the MD page store 540, and the merged metadata updates for the MD page C1 can then be applied to the stored version of the MD page to thereby obtain the latest version of the MD page C1. From the step 612, control proceeds to the step 614.

At the step 614, the latest version of the MD page C1 just constructed can be stored in the node's volatile memory cache. In response to the read request, the latest version of the MD page just constructed and stored in the node's volatile memory cache can be returned.

As discussed above, the full MD page construction (e.g., step 612, cache miss processing) to obtain a latest version of the requested MD page can occur when the requested MD page is not located in the node's cache.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a plurality of metadata (MD) updates for a plurality of MD pages;
recording the plurality of MD updates for the plurality of MD pages in a MD log; and
performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:
writing a first portion of the plurality of MD updates from the MD log to the first bucket area of the first tablet; and
writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet;

receiving a read request to read a first MD page of the first plurality of MD pages;

determining that the first MD page is not stored in a cache; and responsive to determining that the first MD page is not stored in the cache, performing read miss processing including constructing an updated version of the first MD page, wherein said constructing an updated version of the first MD page includes:

reading a stored version of the first MD page from a MD page store; and applying MD updates to the stored version of the first MD page and generating the updated version of the first MD page, wherein MD updates applied to the stored version of the first MD page include first MD updates to the first MD page and second MD updates to the first MD page, wherein the first MD updates are included in corresponding buckets and extension areas of the first plurality of tablets, wherein the second MD updates to the first MD page are included in corresponding buckets of an active MD log stored in volatile memory and corresponding buckets of an inactive MD log stored in volatile memory; and returning the updated version of the first MD page in response to the read request.

2. The computer-implemented method of claim 1, wherein said first destaging phase includes:

determining, for a first bucket of the first plurality of buckets of the first tablet, that the first bucket is full and includes MD updates for a corresponding first MD page of the plurality of MD pages; and responsive to determining the first bucket is full, storing one or more of the plurality of MD updates which update the corresponding first MD page in the first extension area of the first tablet.

3. The computer-implemented method of claim 2, wherein each of the first plurality of buckets of the first tablet includes MD updates for a single corresponding one of the first plurality of MD pages.

4. The computer-implemented method of claim 1, wherein the first tablet includes the first extension area occupying a first amount of storage, and wherein a second tablet of the first plurality of tablets includes a second extension area occupying a second amount of storage that is different from the first amount of storage.

5. The computer-implemented method of claim 4, wherein the second amount is zero denoting that the second extension area occupies no storage and indicating there are no MD updates stored in the second extension area and no MD updates which overflow buckets of a second bucket area of the second tablet.

6. The computer-implemented method of claim 1, further comprising:

performing a second destaging phase that destages the first plurality of tablets from the first non-volatile storage to a MD page store stored on second non-volatile storage.

7. The computer-implemented method of claim 6, wherein a first bucket of each of the first plurality of tablets includes MD updates for a first corresponding MD page, and wherein the second destaging phase includes:

aggregating first MD updates for the first corresponding MD page into a first working set of MD updates for the first corresponding MD page, wherein said first working set includes MD updates for the first corresponding MD page from the first bucket of each of the first plurality of tablets, and wherein said first working set includes MD updates for the first corresponding MD page from one or more extension areas of one or more of the first plurality of tablets;

reading an existing copy of the first corresponding MD page from the MD page store;

generating a first updated MD page by applying the first working set of MD updates to the existing copy of the first corresponding MD page; and storing the first updated MD page in the MD page.

8. The computer-implemented method of claim 7, wherein a superblock includes tablets information describing the first plurality of tablets, wherein the tablets information includes first information indicating, for each of the first plurality of tablets, any one or more of: a starting position, an offset, and a location in the first non-volatile storage of where said each tablet is stored in the first non-volatile storage.

9. A system comprising:

one or more processors; and one or more memories comprising code stored thereon that, when executed, performs a method of comprising:

receiving a plurality of metadata (MD) updates for a plurality of MD pages;

recording the plurality of MD updates for the plurality of MD pages in a MD log; and performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:

writing a first portion of the plurality of MD updates from the MD log to the first bucket area of the first tablet; and writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet;

receiving a read request to read a first MD page of the first plurality of MD pages;

determining that the first MD page is not stored in a cache; and responsive to determining that the first MD page is not stored in the cache, performing read miss processing including constructing an updated version of the first MD page, wherein said constructing an updated version of the first MD page includes:

reading a stored version of the first MD page from a MD page store; and applying MD updates to the stored version of the first MD page and generating the updated version of the first MD page, wherein MD updates applied to the stored version of the first MD page include first MD updates to the first MD page and second MD updates to the first MD page, wherein the first MID updates are included in corresponding buckets and extension areas of the first plurality of tablets, wherein the second MD updates to the first MD page are included in corresponding buckets of an active MD log stored in volatile memory and corresponding buckets of an inactive MD log stored in volatile memory; and returning the updated version of the first MD page in response to the read request.

10. A non-transitory computer readable medium comprising code stored thereon that, when executed, performs a method comprising:

receiving a plurality of metadata (MD) updates for a plurality of MD pages;

recording the plurality of MD updates for the plurality of MD pages in a MD log; and performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:

writing a first portion of the plurality of MD updates from the MD log to the first bucket area of the first tablet; and writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet;

receiving a read request to read a first MD page of the first plurality of MD pages;

determining that the first MD page is not stored in a cache; and responsive to determining that the first MD page is not stored in the cache, performing read miss processing including constructing an updated version of the first MD page, wherein said constructing an updated version of the first MD page includes:

reading a stored version of the first MD page from a MD page store; and applying MD updates to the stored version of the first MD page and generating the updated version of the first MD page, wherein MD updates applied to the stored version of the first MD page include first MD updates to the first MD page and second MD updates to the first MD page, wherein the first MD updates are included in corresponding buckets and extension areas of the first plurality of tablets, wherein the second MD updates to the first MD page are included in corresponding buckets of an active MD log stored in volatile memory and corresponding buckets of an inactive MD log stored in volatile memory; and returning the updated version of the first MD page in response to the read request.

11. A computer-implemented method comprising:

receiving a plurality of metadata (MD) updates for a plurality of MD pages;

recording the plurality of MD updates for the plurality of MD pages in a MD log; and performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:

writing a first portion of the plurality of MD updates from the MD log to the first bucket area of the first tablet; and writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet; and performing a second destaging phase that destages the first plurality of tablets from the first non-volatile storage to a MD page store stored on second nonvolatile storage, wherein a first bucket of each of the first plurality of tablets includes MD updates for a first corresponding MD page, and wherein the second destaging phase includes:
  aggregating first MD updates for the first corresponding MD page into a first working set of MD updates for the first corresponding MD page, wherein said first working set includes MD updates for the first corresponding MD page from the first bucket of each of the first plurality of tablets, and wherein said first working set includes MD updates for the first corresponding MD page from one or more extension areas of one or more of the first plurality of tablets;
  reading an existing copy of the first corresponding MD page from the MD page store;
  generating a first updated MD page by applying the first working set of MD updates to the existing copy of the first corresponding MD page; and
  storing the first updated MD page in the MD page, wherein the extension area of each of the first plurality of tablets stores MD updates to MD pages based on increasing order of logical indices or identifiers of corresponding MD pages, wherein the first bucket of each of the first plurality tablets comprises a first bucket header, and wherein the first bucket header includes an extension position identifying a starting position, offset or location of the extension area of said each tablet, wherein the first bucket header includes an extension minimum logical index (LI) identifying the minimum LI associated with any MD update stored in the extension area of an associated tablet including the bucket header and the extension area.

12. The computer-implemented method of claim 11, wherein the first corresponding MD page is uniquely associated with a first LI, and wherein the method further comprises:
  determining, in accordance with the first LI of the first corresponding MD page and in accordance with the extension minimum LI of the first bucket header of each of the first plurality of tablets, whether the extension area of said each tablet includes MD updates for the first corresponding MD page; and
  responsive to determining that the extension area of said each tablet includes MD updates for the first corresponding MD page, reading MD updates for the first corresponding tablet from the extension area of said each tablet and including the retrieved MD updates from the extension area in the first working set of MD updates for the first corresponding MD page.

13. The computer-implemented method of claim 12, wherein said determining, in accordance with the first LI of the first corresponding MD page and in accordance with the extension minimum LI of the first bucket header of each of the first plurality of tablets, whether the extension area of said each tablet includes MD updates for the first corresponding MD page further includes:
  determining whether the first LI is less than the extension minimum LI of said each tablet; and
  responsive to determining that first LI is less than the extension minimum LI of said each tablet, determining that the extension area of said each tablet does not include MD updates for the first corresponding MD page, and otherwise determining that the extension area of said each tablet does include MD updates for the first corresponding MD page.

14. The computer-implemented method of claim 11, further comprising:
  locating each tablet of the first plurality of tablets within the first non-volatile storage using, from the tablets information of the superblock, the starting position, offset or location of said each tablet identifying where said each tablet is stored in the first non-volatile storage.

15. A system comprising:
  one or more processors; and
  one or more memories comprising code stored thereon that, when executed, performs a method of comprising:
    receiving a plurality of metadata (MD) updates for a plurality of MD pages;
    recording the plurality of MD updates for the plurality of MD pages in a MD log; and
    performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:
      writing a first portion of the plurality of MD updates from the MD log to the first bucket area of the first tablet; and
      writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet; and
    performing a second destaging phase that destages the first plurality of tablets from the first non-volatile storage to a MD page store stored on second non-volatile storage, wherein a first bucket of each of the first plurality of tablets includes MD updates for a first corresponding MD page, and wherein the second destaging phase includes:
      aggregating first MD updates for the first corresponding MD page into a first working set of MD updates for the first corresponding MD page, wherein said first working set includes MD updates for the first corresponding MD page from the first bucket of each of the first plurality of tablets, and wherein said first working set includes MD updates for the first corresponding MD page from one or more extension areas of one or more of the first plurality of tablets;
      reading an existing copy of the first corresponding MD page from the MD page store;

generating a first updated MD page by applying the first working set of MD updates to the existing copy of the first corresponding MD page; and storing the first updated MD page in the MD page, wherein the extension area of each of the first plurality of tablets stores MD updates to MD pages based on increasing order of logical indices or identifiers of corresponding MD pages, wherein the first bucket of each of the first plurality tablets comprises a first bucket header, and wherein the first bucket header includes an extension position identifying a starting position, offset or location of the extension area of said each tablet, wherein the first bucket header includes an extension minimum logical index (LI) identifying the minimum LI associated with any MD update stored in the extension area of an associated tablet including the bucket header and the extension area.

16. A non-transitory computer readable medium comprising code stored thereon that, when executed, performs a method comprising:

receiving a plurality of metadata (MD) updates for a plurality of MD pages;

recording the plurality of MD updates for the plurality of MD pages in a MD log; and performing a first destaging phase that writes the plurality of MD updates for the plurality of MD pages from the MD log to a first tablet stored on first non-volatile storage, wherein the first tablet includes a first bucket area and a first extension area, wherein the first bucket area includes a first plurality of buckets each a predetermined bucket size, and wherein said first destaging phase further includes:

writing a first portion of the plurality of MD updates from the MD log to the first bucket area of the first tablet; and writing a second portion of the plurality of MD updates from the MD log to the first extension area of the first tablet, wherein each MD update of the second portion overflows a corresponding one of the first plurality of buckets associated with one of the plurality of MD pages updated by said each MD update, wherein the first non-volatile storage includes a first plurality of tablets, wherein the first plurality of tablets includes the first tablet, wherein each of the first plurality of tablets includes a fixed size bucket area which has a same first size in each of the first plurality of tablets and which has a same first number of buckets in each of the first plurality of tablets, wherein each bucket of the same first number of buckets in each of the first plurality of tablets is said predetermined bucket size, wherein each of the first plurality of tablets includes an extension area storing MD updates which overflow one or more buckets of the fixed size bucket area of said each tablet; and performing a second destaging phase that destages the first plurality of tablets from the first non-volatile storage to a MD page store stored on second non-volatile storage, wherein a first bucket of each of the first plurality of tablets includes MD updates for a first corresponding MD page, and wherein the second destaging phase includes:

aggregating first MD updates for the first corresponding MD page into a first working set of MD updates for the first corresponding MD page, wherein said first working set includes MD updates for the first corresponding MD page from the first bucket of each of the first plurality of tablets, and wherein said first working set includes MD updates for the first corresponding MD page from one or more extension areas of one or more of the first plurality of tablets;

reading an existing copy of the first corresponding MD page from the MD page store;

generating a first updated MD page by applying the first working set of MD updates to the existing copy of the first corresponding MD page; and storing the first updated MD page in the MD page, wherein the extension area of each of the first plurality of tablets stores MD updates to MD pages based on increasing order of logical indices or identifiers of corresponding MD pages, wherein the first bucket of each of the first plurality tablets comprises a first bucket header, and wherein the first bucket header includes an extension position identifying a starting position, offset or location of the extension area of said each tablet, wherein the first bucket header includes an extension minimum logical index (LI) identifying the minimum LI associated with any MD update stored in the extension area of an associated tablet including the bucket header and the extension area.

* * * * *